United States Patent
Rich et al.

(10) Patent No.: US 9,142,840 B2
(45) Date of Patent: Sep. 22, 2015

(54) METHOD OF REDUCING TABBING VOLUME REQUIRED FOR EXTERNAL CONNECTIONS

(75) Inventors: David Gerard Rich, Waterloo (CA); Taha Shabbir Husain Sutarwala, Mississauga (CA); Andre John Van Schyndel, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 642 days.

(21) Appl. No.: 13/278,969

(22) Filed: Oct. 21, 2011

(65) Prior Publication Data

US 2013/0101891 A1    Apr. 25, 2013

(51) Int. Cl.
| | |
|---|---|
| *H01M 2/02* | (2006.01) |
| *H01M 6/42* | (2006.01) |
| *H01M 2/24* | (2006.01) |
| *H01M 2/08* | (2006.01) |
| *H01M 6/46* | (2006.01) |
| *H01M 2/26* | (2006.01) |

(Continued)

(52) U.S. Cl.
CPC ............. *H01M 6/46* (2013.01); *H01M 2/204* (2013.01); *H01M 2/26* (2013.01); *H01M 4/0402* (2013.01); *H01M 4/70* (2013.01); *H01M 2/202* (2013.01); *H01M 2/30* (2013.01); *H01M 4/139* (2013.01); *H01M 10/0436* (2013.01); *H01M 10/052* (2013.01)

(58) Field of Classification Search
CPC .......... H01M 2/021; H01M 6/42; H01M 2/08
USPC ........................... 429/179, 178, 180, 157, 158
See application file for complete search history.

(56) References Cited

U.S. PATENT DOCUMENTS

| | | |
|---|---|---|
| 4,042,760 A | 8/1977 | Land |
| 4,119,770 A | 10/1978 | Land |

(Continued)

FOREIGN PATENT DOCUMENTS

| | | |
|---|---|---|
| CA | 2243645 C | 6/2007 |
| CA | 2792948 A1 | 4/2013 |

(Continued)

OTHER PUBLICATIONS

Co-pending U.S. Appl. No. 13/279,028, "Recessed Tab for Higher Energy Density and Thinner Batteries", filed Oct. 24, 2011.

(Continued)

*Primary Examiner* — Patrick Ryan
*Assistant Examiner* — Julian Anthony
(74) *Attorney, Agent, or Firm* — Fish & Richardson P.C.

(57) ABSTRACT

Various embodiments are described herein for an electrode assembly for a stacked-cell battery. The electrode assembly comprises a first active material layer; a first current collector layer adjacent to and in electrical contact with an outer surface of the first active material layer; a tab element having an end lead portion and a second lead portion, the end lead portion being in electrical contact with at least one of the first active material layer and the first current collector layer, and the second lead portion extending away from the end lead portion and being substantially adjacent to a surface of at least one of the first active material layer and the first current collector layer and is adapted to provide an electrical connection to the electrode assembly; and an insulative layer covering an inner contact area of the second lead portion to electrically insulate this portion of the tab element.

25 Claims, 10 Drawing Sheets

(51) Int. Cl.
  *H01M 4/04*   (2006.01)
  *H01M 4/70*   (2006.01)
  *H01M 2/30*       (2006.01)
  *H01M 2/20*       (2006.01)
  *H01M 4/139*      (2010.01)
  *H01M 10/04*      (2006.01)
  *H01M 10/052*     (2010.01)

(56) References Cited

U.S. PATENT DOCUMENTS

| | | |
|---|---|---|
| 4,150,200 A | 4/1979 | Sullivan |
| 4,582,767 A | 4/1986 | Morioka et al. |
| 4,619,753 A | 10/1986 | Christen et al. |
| 5,419,982 A | 5/1995 | Tura et al. |
| 5,419,985 A | 5/1995 | Koksbang |
| 5,498,489 A | 3/1996 | Dasgupta et al. |
| 5,518,840 A | 5/1996 | Verhoog et al. |
| 5,532,086 A | 7/1996 | Thibault et al. |
| 5,591,540 A | 1/1997 | Louie et al. |
| 5,670,273 A | 9/1997 | Velasquez et al. |
| 5,746,781 A | 5/1998 | Velasquez et al. |
| 5,814,420 A | 9/1998 | Chu |
| 5,894,656 A | 4/1999 | Menon et al. |
| 6,152,971 A | 11/2000 | Miyanowaki et al. |
| 6,159,253 A | 12/2000 | Lund |
| 6,231,626 B1 | 5/2001 | Yoshida et al. |
| 6,346,346 B1 | 2/2002 | Naskali |
| 6,352,797 B1 | 3/2002 | Yoshida et al. |
| 6,458,485 B2 | 10/2002 | Yanai et al. |
| 6,515,449 B1 | 2/2003 | Thomas et al. |
| 6,592,635 B2 | 7/2003 | Getz |
| 6,645,670 B2 | 11/2003 | Gan |
| 6,664,006 B1 | 12/2003 | Munshi |
| 6,815,121 B2 | 11/2004 | Dasgupta et al. |
| 7,067,218 B2 | 6/2006 | Hong |
| 7,150,768 B2 | 12/2006 | Airey et al. |
| 7,179,562 B2 | 2/2007 | Zolotnik et al. |
| 7,201,997 B2 | 4/2007 | Ishida et al. |
| 7,304,832 B2 | 12/2007 | Ushio et al. |
| 7,320,846 B2 | 1/2008 | Watanabe et al. |
| 7,585,589 B2 | 9/2009 | Kim |
| 7,776,468 B2 | 8/2010 | Richards et al. |
| 7,901,808 B2 | 3/2011 | Morgan et al. |
| 2001/0049032 A1 | 12/2001 | Gan |
| 2002/0028377 A1 | 3/2002 | Gross |
| 2002/0102455 A1 | 8/2002 | Daroux et al. |
| 2002/0146620 A1 | 10/2002 | Connell |
| 2003/0014859 A1 | 1/2003 | Kejha et al. |
| 2003/0031926 A1 | 2/2003 | Farmer et al. |
| 2003/0111512 A1 | 6/2003 | O'Connell et al. |
| 2003/0113630 A1 | 6/2003 | Kainthla et al. |
| 2003/0134190 A1 | 7/2003 | Ishida et al. |
| 2003/0175585 A1 | 9/2003 | Ugaji et al. |
| 2004/0048152 A1 | 3/2004 | Yata et al. |
| 2004/0081890 A1 | 4/2004 | Xing et al. |
| 2004/0110068 A1 | 6/2004 | Seki et al. |
| 2004/0126663 A1 | 7/2004 | Sudano et al. |
| 2004/0127952 A1 | 7/2004 | O'Phelan et al. |
| 2004/0253512 A1 | 12/2004 | Watanabe et al. |
| 2005/0058908 A1 | 3/2005 | Imachi et al. |
| 2005/0208381 A1 | 9/2005 | Boulton et al. |
| 2005/0214648 A1 | 9/2005 | Boulton et al. |
| 2005/0284750 A1 | 12/2005 | Nishimura et al. |
| 2006/0073382 A1 | 4/2006 | Urano et al. |
| 2006/0099507 A1 | 5/2006 | Kogetsu et al. |
| 2006/0105243 A1 | 5/2006 | Okamura et al. |
| 2006/0147792 A1 | 7/2006 | Nelson et al. |
| 2006/0154141 A1 | 7/2006 | Salot et al. |
| 2006/0159999 A1 | 7/2006 | Kejha et al. |
| 2006/0172202 A1 | 8/2006 | Smith et al. |
| 2006/0187614 A1 | 8/2006 | Ushio et al. |
| 2006/0204839 A1 | 9/2006 | Richards et al. |
| 2007/0020796 A1 | 1/2007 | Park |
| 2007/0048595 A1 | 3/2007 | Graham et al. |
| 2007/0079500 A1 | 4/2007 | Silverman |
| 2007/0226990 A1 | 10/2007 | Morimoto |
| 2007/0231684 A1 | 10/2007 | Takano et al. |
| 2007/0231701 A1 | 10/2007 | Lee |
| 2008/0020272 A1 | 1/2008 | Kemper |
| 2008/0028598 A1 | 2/2008 | Hong |
| 2008/0070115 A1 | 3/2008 | Saruwatari et al. |
| 2008/0083113 A1 | 4/2008 | Hong |
| 2008/0102359 A1 | 5/2008 | Kogetsu et al. |
| 2008/0138696 A1 | 6/2008 | Bartling |
| 2008/0153000 A1 | 6/2008 | Salot et al. |
| 2008/0187828 A1 | 8/2008 | Oh et al. |
| 2009/0017380 A1 | 1/2009 | Honda et al. |
| 2009/0029240 A1 | 1/2009 | Gardner et al. |
| 2009/0035657 A1 | 2/2009 | Buiel et al. |
| 2009/0142659 A1 | 6/2009 | Lai et al. |
| 2009/0162739 A1 | 6/2009 | Han et al. |
| 2009/0197160 A1 | 8/2009 | Fujiwara et al. |
| 2009/0197162 A1 | 8/2009 | Shinyashiki et al. |
| 2009/0246618 A1 | 10/2009 | Dirks |
| 2009/0305120 A1 | 12/2009 | Blomgren et al. |
| 2009/0311607 A1 | 12/2009 | Han et al. |
| 2010/0024203 A1 | 2/2010 | Kim et al. |
| 2010/0092869 A1 | 4/2010 | Kaneko et al. |
| 2010/0099029 A1 | 4/2010 | Kinoshita et al. |
| 2010/0136411 A1 | 6/2010 | Yoon et al. |
| 2010/0178559 A1 | 7/2010 | Mao et al. |
| 2010/0216007 A1 | 8/2010 | Kane et al. |
| 2010/0227211 A1 | 9/2010 | Chang et al. |
| 2010/0266898 A1 | 10/2010 | Yamamoto et al. |
| 2010/0285352 A1 | 11/2010 | Juzkow et al. |
| 2011/0045344 A1* | 2/2011 | Kim ............................ 429/179 |
| 2011/0052972 A1 | 3/2011 | Sohn |
| 2011/0070477 A1 | 3/2011 | Fujiwara et al. |
| 2011/0129720 A1 | 6/2011 | Yun |
| 2013/0101896 A1 | 4/2013 | Rich et al. |

FOREIGN PATENT DOCUMENTS

| | | |
|---|---|---|
| CA | 2792949 A1 | 4/2013 |
| CN | 1466236 | 1/2004 |
| CN | 1755964 A | 4/2006 |
| CN | 101931097 A | 12/2010 |
| CN | 103066237 A | 4/2013 |
| CN | 103066239 A | 4/2013 |
| CN | 101816093 B | 9/2013 |
| EP | 1487034 A2 | 12/2004 |
| EP | 1282178 B1 | 2/2009 |
| EP | 2309576 A1 | 4/2011 |
| EP | 2309581 A1 | 4/2011 |
| EP | 2584629 A1 | 4/2013 |
| EP | 2584630 A1 | 4/2013 |
| JP | 01-112562 U | 7/1989 |
| JP | 04-075251 A | 3/1992 |
| JP | 04-188568 A | 7/1992 |
| JP | 10-027602 A | 1/1998 |
| JP | H10-064526 A | 3/1998 |
| JP | 11-162443 A | 6/1999 |
| JP | 2000-243376 A | 9/2000 |
| JP | 2003-168403 A | 6/2003 |
| JP | 2003-208889 A | 7/2003 |
| JP | 2004-022534 A | 1/2004 |
| JP | 2004-505430 A | 2/2004 |
| JP | 2005-197217 A | 7/2005 |
| JP | 2007-005278 A | 1/2007 |
| JP | 2009-054669 A | 3/2009 |
| JP | 2009-146712 A | 7/2009 |
| JP | 2009146712 | 7/2009 |
| JP | 201034009 A | 2/2010 |
| JP | 2010086807 A | 4/2010 |
| JP | 2010205693 A | 9/2010 |
| JP | 2013-030385 A | 2/2013 |
| JP | 201389602 A | 5/2013 |
| JP | 201389604 A | 5/2013 |
| JP | 5542893 B2 | 7/2014 |
| JP | 5632892 B2 | 11/2014 |
| KR | 1020000021401 | 4/2000 |
| KR | 1020010034618 A | 4/2001 |
| KR | 2002-0077488 A | 10/2002 |

(56) References Cited

FOREIGN PATENT DOCUMENTS

| KR | 2003-0095519 A | 12/2003 |
|---|---|---|
| KR | 2007-0078853 A | 8/2007 |
| KR | 2011-0036499 A | 4/2011 |
| KR | 2011-0061315 A | 6/2011 |
| KR | 1020110066154 A | 6/2011 |
| KR | 1020130044186 A | 5/2013 |
| KR | 1020130044188 A | 5/2013 |
| KR | 1422925 B1 | 7/2014 |
| WO | 0211217 A2 | 2/2002 |
| WO | 02101849 A2 | 12/2002 |
| WO | 2009149231 A2 | 12/2009 |
| WO | 2010131780 A1 | 11/2010 |
| WO | 2011004330 A1 | 1/2011 |
| WO | 2011026087 A2 | 3/2011 |

OTHER PUBLICATIONS

English abstract of CN103066237, published on Apr. 24, 2013 and retrieved on Sep. 4, 2013.
English abstract of CN103066239, published Apr. 24, 2013 and retrieved on Sep. 4, 2013.
English abstract of JP2013089602, published on May 13, 2013 and retrieved on Sep. 4, 2013.
English abstract of JP201389604, published on May 13, 2013 and retrieved on Sep. 4, 2013.
Extended European Search Report for European Patent Application No. 11186096.1 dated Mar. 29, 2012.
Co-pending U.S. Appl. No. 13/279,028, "Recessed Tab for Higher Energy Density and Thinner Batteries", filed Oct. 21, 2011.
English Abstract for JP2010205693, published Sep. 16, 2010.
English translation of the Office Action dated Dec. 19, 2013, in corresponding Japanese patent application No. 2013-231806.
Examination Report dated Oct. 26, 2012, in corresponding European patent application No. 11186096.1.
Examination Report Response dated Dec. 17, 2013, in corresponding European patent application No. 11186096.1.
English abstract for JPH1064526; published on Mar. 6, 1998 and retrieved Jan. 22, 2014.
English abstract for JP2000243376; published on Sep. 8, 2000 and retrieved on Jan. 22, 2014.
English abstract for JP2003208889; published Jul. 25, 2003 and retrieved on Jan. 22, 2014.
English abstract for JP2004505430; published on Feb. 19, 2004 and retrieved on Jan. 22, 2014.
English abstract for JP2007005278; published on Jan. 11, 2007 and retrieved on Jan. 22, 2014.
English abstract for JP2009054669; published on Mar. 12, 2009 and retrieved on Jan. 22, 2014.
English abstract for JP2004022534; published on Jan. 22, 2004 and retrieved on Jan. 22, 2014.
English abstract for JP2003168403; published on Jun. 13, 2003 and retrieved on Jan. 22, 2014.
English abstract for JPH11162443; published on Jun. 18, 1999 and retrieved on Jan. 22, 2014.
English abstract for JPH1027602; published on Jan. 27, 1998 and retrieved on Jan. 22, 2014.
English abstract for KR20110061315; published on Jun. 9, 2011 and retrieved on Jan. 23, 2014.
English abstract for KR20070078853; published on Aug. 3, 2007 and retrieved on Jan. 23, 2014.
English abstract for KR20030095519; published on Dec. 24, 2003 and retrieved on Jan. 23, 2014.
English abstract for KR20110036499; published on Apr. 7, 2011 and retrieved on Jan. 23, 2014.
English translation for the Office Action dated Dec. 24, 2013, in corresponding Japanese patent application No. 2012-232013.
Examination Report mailed Aug. 14, 2013; in corresponding European patent application No. 11186096.1.
English translation of the Office Action mailed Oct. 22, 2013; in corresponding Korean patent application No. 10-2012-0116846.
English translation of the Office Action mailed mailed Dec. 19, 2013; in corresponding Japanese patent application No. 2012-231806.
Notice of Allowance mailed Apr. 24, 2014; in corresponding Japanese patent application No. 2012-231806.
Notice of Allowance Due mailed Apr. 30, 2014; in corresponding Korean patent application No. 10-2012-0116846.
Examination Report mailed Apr. 28, 2014; in corresponding European patent application No. 11186096.1.
Document relating to JP Application No. 2012-231806 filed Oct. 19, 2012 (Patent Certificate).
Office Action Response filed Jun. 16, 2014; in corresponding Canadian patent application No. 2,792,948.
Examination Report Response filed Jul. 22, 2014; in corresponding European patent application No. 11186096.1.
Machine translation for CN103066237; published on Apr. 24, 2013.
Machine translation for CN103066239; published on Apr. 24, 2013.
Machine translation for EP2309581; published on Apr. 13, 2011.
Machine translation for JP10064526; published on Mar. 6, 1998.
Machine translation for JP2000243376; published on Sep. 8, 2000.
Machine translation for JP2003208889; published on Jul. 25, 2003.
Machine translation for JP2004505430; published on Feb. 19, 2004.
Machine translation for JP2007005278; published on Jan. 11, 2007.
Machine translation for JP2010034009; published on Feb. 12, 2010.
Machine translation for JP2010205693; published on Sep. 16, 2010.
Machine translation for JP2013089602; published on May 13, 2013.
Machine translation for JP2013089604; published on May 13, 2013.
Machine translation for JP2010086807; published on Apr. 15, 2010.
Machine translation for KR1020110036499; published on Apr. 7, 2011.
Machine translation for KR1020020077488; published on Oct. 11, 2002.
Machine translation for KR1020030095519; published on Dec. 24, 2003.
Machine translation for KR1020070078853; published on Aug. 3, 2007.
Machine translation for KR1020110061315; published on Jun. 9, 2011.
Machine translation for KR1020130044188; published on May 2, 2013.
Machine translation for JP10027602; published on Jan. 27, 1998.
Machine translation for JP11162443; published on Jun. 18, 1999.
Machine translation for JP2003168403; published on Jun. 13, 2003.
Machine translation for JP2004022534; published on Jan. 22, 2004.
Machine translation for JP2009054669; published on Mar. 12, 2009.
Machine translation for CN101931097; published on Dec. 29, 2010.
Machine translation for JP5542893; published on Jul. 9, 2014.
English translation of the allowed claims in corresponding Japanese patent application No. 2012-231806.
English translation of the Notice of Allowance and Fee(s) Due mailed Apr. 30, 2014; in corresponding Korean patent application No. 10-2012-0116846.
Office Action mailed Oct. 22, 2013; in corresponding Korean patent application No. 10-2012-0116846.
Office Action mailed Dec. 19, 2013; in corresponding Japanese patent application No. 2012-231806.
English translation of the Certificate of Patent Issued Jul. 17, 2014; in corresponding Korean Patent Application No. 10-2012-0116846.
Office Action mailed Sep. 1, 2014; in corresponding Chinese Patent Application No. 201210401306.9.
Certificate of Patent Issued Jul. 17, 2014; in corresponding Korean Patent Application No. 10-2012-0116846.
English Machine translation for CN1466236; published on Jan. 7, 2004.
English Machine translation for CN1755964; published on Apr. 5, 2006.
English Machine translation for CN101816093; published on Sep. 25, 2013.
English Machine translation for KR101422925; published on Jul. 17, 2014.
English machine translation of KR1020000021401; published on Apr. 25, 2000.
Office Action mailed Feb. 27, 2014; in corresponding Canadian patent application No. 2,792,948.

(56) References Cited

OTHER PUBLICATIONS

English translation of the Response filed Mar. 18, 2014; in corresponding Japanese patent application No. 2012-231806.
Response filed Mar. 18, 2014; in corresponding Japanese patent application No. 2012-231806.
Office Action mailed Oct. 6, 2014; in U.S. Appl. No. 13/279,028.
Office Action Response filed Dec. 8, 2014; in U.S. Appl. No. 13/279,028.
Notice of Allowance and Fee(s) Due mailed Dec. 8, 2014; in Canadian patent application No. 2,792,948.
Office Action Response filed Dec. 25, 2014; in Chinese patent application No. 201210401306.9.
Machine translation for JP5632892; published on Nov. 26, 2014.
Machine translation for JP2009146712; published on Jul. 2, 2009.
Machine translation for JP2013030385; published Feb. 7, 2013.
Machine translation for KR1020010034618; published Apr. 25, 2001.
Machine translation for KR1020110066154; published Jun. 16, 2011.
Machine translation for JP2005197217; published on Jul. 21, 2005.
English abstract for JP01112562; published on Jul. 28, 1989.
English abstract for JP04075251; published on Mar. 10, 1992.
English abstract for JP04188568; published on Jul. 7, 1992.
Examination Report dated Mar. 23, 2015, issued on corresponding European Patent Application No. 11186096.1.
Non-Final Rejection dated Mar. 10, 2015, issued on related U.S. Appl. No. 13/279,028.

* cited by examiner

METHOD OF REDUCING TABBING VOLUME REQUIRED FOR EXTERNAL CONNECTIONS

FIELD

The embodiments described herein relate generally to energy storage elements and, more particularly, to battery structures.

BACKGROUND

Mobile devices are extensively used in everyday life. These mobile devices are powered by batteries that are in most cases rechargeable but in other cases can be disposable. It is important in both of these cases that these batteries have a high capacity so that they last a long time before having to be recharged or replaced as the case may be. However, mobile devices, such as handheld devices, have limited space for batteries. Therefore, it is important for batteries to be designed in a space-efficient manner to provide a suitable amount of charge.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which.

DESCRIPTION OF EMBODIMENTS

Figure 1:
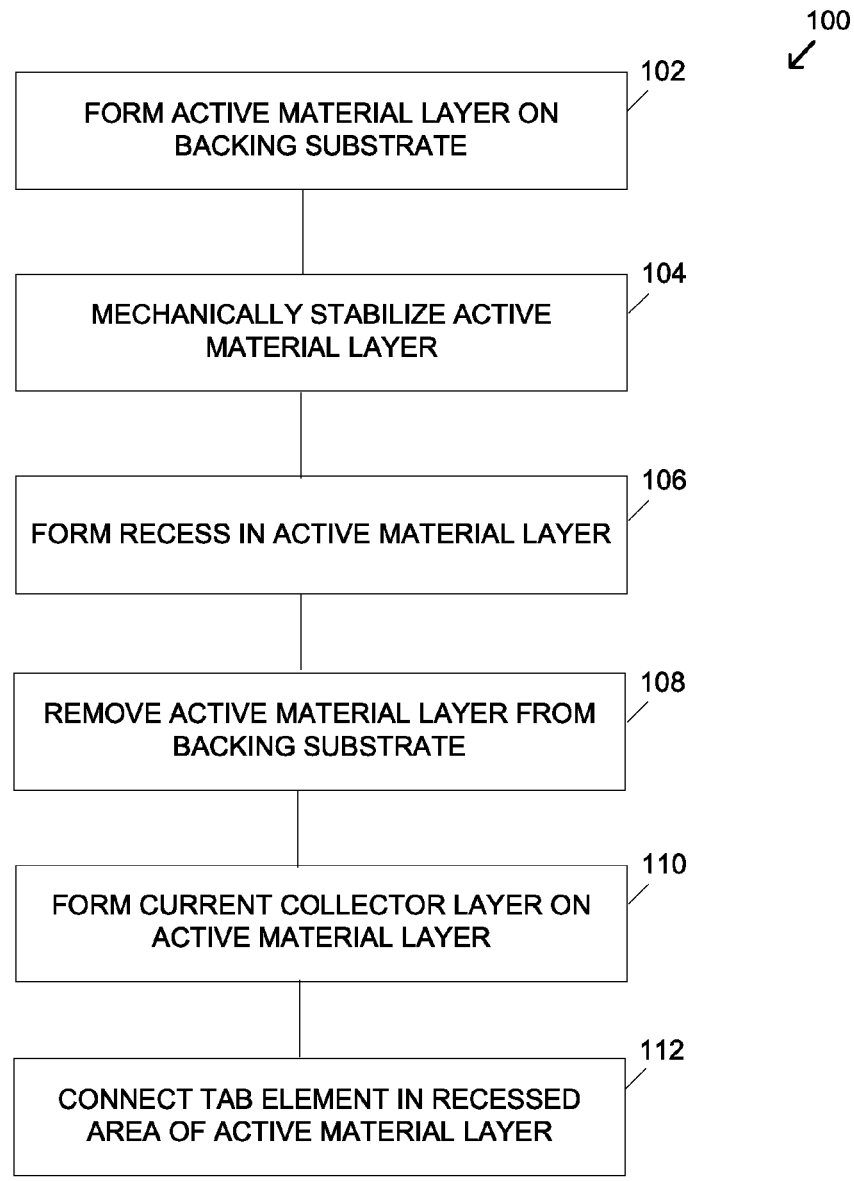
FIG. 1 is an example embodiment of a method to manufacture an electrode assembly for a battery.

Various apparatuses or processes will be described below to provide example embodiments of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to energy storage elements for mobile devices and, more particularly, to various designs for electrode assemblies for stacked-cell batteries that allow for at least one of higher energy density, more compact stacks, and more flexibility when connecting together various cells in a battery or when connecting together various stacked-cell batteries.

In battery configurations, the electrode assembly consists of an active material layer supported by a current collector layer. A tab element is connected to the electrode assembly to make an electrical connection with the active material layer. The tab element is conventionally formed "in-line" with the current collector layer such that the height or thickness of the tab element and the current collector layer are approximately equal. The tab element and the current collector layer are also fixed to a common surface of the active material layer. This electrode assembly forms the cathode or anode for a battery cell.

The minimum thickness of the current collector layer is limited due to three issues with conventional battery manufacturing processes. These limitations are important since a thicker current collector layer will reduce the percentage of the active material layer to the overall area of the electrode assembly (given size constraints on a battery) which will in turn reduce the energy density of the battery. However, the inventors have realized various designs with a thinner current collector layer that would result in more active material in the battery per unit volume and, therefore, higher battery capacity per unit volume.

The first constraint on the thickness of the current collector layer is due to the need for mechanical stability during manufacturing. The active material used for the anode and cathode layers in current stacked-cell battery topologies is typically very soft and unstable. For example, for a typical portable electronic battery, the anode can be made from graphite and the cathode can be made from lithium cobalt dioxide. There are also a number of other commercially viable possibilities as is known by those skilled in the art. The teachings described herein can be used with these various different combinations of materials. Accordingly, due to these soft and unstable materials, in order to create the layers of an electrode assembly, conventional manufacturing processes first form the current collector layer, then deposit the active material onto the current collector layer as a liquid or aqueous solution known as a slurry, and then cure the active material layer. After curing, the active material layer and its adherence to the current collector may be still fairly fragile. Therefore, the current collector layer acts as a substrate for the active material layer during manufacturing to provide stability and mechanical strength to the active material layer. If the active material layer and/or the current collector layer were to break when the electrode assembly is being manufactured, the production line process would need to be shut down. To prevent this from happening, the current collector layer is conventionally formed with a minimum thickness to provide the required mechanical strength and stability. This minimum thickness is also set, in part, by the throughput of the manufacturing equipment in order to avoid breakages in the electrode assembly while producing electrode assemblies at a certain speed. A higher throughput speed then requires greater mechanical strength for the electrode assembly which in turn requires a thicker current collector layer.

A second constraint on the thickness of the current collector layer is the effect of the current collector layer on the Equivalent Series Resistance (ESR) of the battery. Since the current collector layer conducts current to/from the external terminals of a battery cell, the effective electrical resistance of the current collector layer is inversely proportional to the cross sectional area of the current flow, which in this case is the cross-sectional area of the current collector layer. In general, current collector layers with a larger thickness will have a larger cross-sectional area which means a lower ESR for the battery.

A third constraint on the thickness of the current collector layer is the solderability of the tab element. In conventional battery topologies, the tab element is generally ultrasonically welded or otherwise attached (using techniques known by those skilled in the art) onto the current collector layer. Since the tab element provides the only electrical connection to the external terminals of the battery, if the tab element breaks, then the battery is ruined. The tab element is therefore conventionally designed to be thick enough to last for the life of the battery. In some cases the tab element can be as thick as the current collector layer to provide a better "matching". Furthermore, the soldering, welding or attaching process may also, in some cases, punch through the current collector layer, which would potentially also ruin the battery by shorting the electrodes. Both of these considerations results in a minimum thickness for the current collector layer.

In conventional battery manufacturing processes, the most severe of the above constraints dictates the minimum possible thickness for the current collector layer. That is, the largest of these three respective minimum values provides the ultimate constraint on the thickness of the current collector layer.

However, the inventors have discovered that the challenges with the thickness of the current collector layer due to conventional battery manufacturing techniques can be overcome if the active material layer can be stabilized independently of the current collector layer. Referring to FIG. 1, shown therein is an example embodiment of a method 100 to manufacture an electrode assembly for a battery. The method 100 starts at step 102 where the active material for a battery electrode assembly is deposited on a temporary backing substrate to form an active material layer. The active material layer comprises an electrolyte polymer. In at least some cases, the electrolyte polymer is mechanically self-stabilizing at ambient temperatures. In step 104, the active material layer is mechanically stabilized. The temporary backing substrate, which can be disposable or reusable, could be Mylar, the same material as the active material layer (Al or Cu), or any other material that meets the mechanical and temperature requirements (these requirements are known by those skilled in the art). The real and reusable current collectors can be "pasted" together at their interface such that they are easily separated from each other when needed during step 108. It should be noted that this mechanical stabilization is independent of using the current collector layer as a backing substrate.

At step 106, once the active material layer is mechanically stable, a recess is formed on an outer surface of the active material layer; however this can also be done during step 104. For example, the temporary backing substrate can be notched or shaped in such a way to provide a negative mold with which to form a recess in the active material layer to receive the tab element. For example, the active material layer can be subjected to a rolling process to increase its density and the recess can be formed by specifically compressing this area a little bit more than the rest of the active material layer. This can be done with graphite material as the active material layer as it is mechanically robust to withstand some amounts of compression and can be deformed under higher amounts of compression. When the active material layer is removed from the temporary backing substrate, a recess to receive the tab element is already pre-formed into the active material layer. The recess can extend from any suitable facet of the active material layer toward an interior portion of the active material layer and at various positions along a given facet. For example, various recesses as described in FIGS. 2A-6 can be formed. In alternative embodiments, the recess can be etched into the active material layer using photolithography techniques, chemical etching or abrasive etching. Furthermore, in alternative embodiments, the recess can also be formed pre- or post the deposition or coating process. Other variations are also possible as is known to those skilled in the art.

At step 108, the active material layer is removed from the backing substrate in such a way that the active material layer is not destroyed. Where there are two substrates, they can be separated using kinder, gentler processes such as being peeled without bending or stressing the active material layer. Where the active material layer is completely separated, it will be much tougher. A binder could also be used and activated to release the active material layer from the backing substrate. The separation process could be very gentle or the active material layers be made of materials that provide a mechanically robust composition. The material used for the binder is selected generally to achieve good adherence and a good ohmic contact for the tab element. However, the material for the binder can also be selected based on the purpose of the battery as is known by those skilled in the art.

At step 110, the active material layer is isolated and a current collector layer is applied to the outer surface of the active material layer such that the recess is not filled in by the current collector layer. It should be noted that this step is the reverse of what is typically done in conventional battery manufacturing processes. The current collector layer can be printed on the active material layer or it can be formed from metal deposition or physically placed into the recess. In the case of metal deposition, in at least some cases, the collector layer can be formed to be substantially continuous on the active material layer. Barrier layers may also be used in certain cases to limit the amount of deposition as is known to those skilled in the art. In some embodiments, the current collector layer can also provide the material that is used for the tab element.

At step 112, a tab element is then secured at least partially within the recess area of the active material layer and attached to the current collector layer. Adhesion or barrier layers may be used for the tab element as is commonly known to those skilled in the art. The tab element can be mechanically welded or otherwise joined to the current collector layer. It should be noted that the tab element can generally be adhered to its neighboring layers using any suitable chemical, electrical or mechanical means (e.g. compression) as is known to those skilled in the art. It should be noted that in some embodiments the order of steps 110 and 112 can be reversed or combined.

With the manufacturing process 100, the three conventional constraints on the thickness of the current collector layer are significantly eased for stacked-cell battery topologies since the current collector layer is not stressed to mechanically stabilize the active material layer like it would be during conventional manufacturing processes. Furthermore, in a stacked-cell battery configuration, each battery cell, which includes an anode electrode assembly, an electrolyte and a cathode electrode assembly, provides a separate electron conduction path which is then connected in parallel with the other battery cells. The resistance of each of these individual paths can therefore be higher (due to a thinner current collector layer) than in conventional battery topologies since each of these conduction paths are connected in parallel. In other words, rather than a single current collector layer with a thickness of 14 microns (as would be used conventionally), two current collector layers each having a thickness of 7 microns and connected in parallel would have the same overall ESR (even though each parallel conduction path has twice the resistance compared to the 14 micron current collector layer).

With the manufacturing process 100, the thickness of the current collector layer is reduced such that the current collector layer is thick enough to be a continuous layer, is not islanded and still allows for the efficient collection of current. However, the current collector layer is thick enough to be connected to the tab element. In this regard, the bond layer between the current collector layer and the tab element can be Ohmic or thermal connections rather than Schottky diode-type interfaces to avoid any voltage drops and non-linearity. As an example, in cases where a conventional battery manufacturing process produces an electrode assembly for a stacked-cell topology with an anode layer having a thickness of 60 microns and a current collector layer having a thickness of 14 microns, the process 100 can be used to produce an electrode assembly for a stacked-cell topology with an anode layer of 65 microns and a current collector layer having a thickness of 9 microns or even less, for example. Accordingly, the tab elements can be made "internal" or recessed into the active material layer so that the tab elements do not require extra thickness. In addition, various methods can be used to improve the bond between the tab element and the current collector layer, such as low-energy, low-penetration microwave soldering, with or without an absorption layer. Layer heating/cooling could also be used to limit a weld's penetration capability. As previously mentioned, various electrical, chemical or mechanical techniques can be used as is known to those skilled in the art. For example, conductive glue or paste may be used in some cases.

The battery manufacturing process 100 therefore provides a stacked-cell topology for a battery that makes use of recessed tab elements and current collector layers with a reduced thickness in order to increase the amount of active material (i.e. anode and cathode), or in other words the active/inactive material ratio, in the battery per unit volume. While the thickness of the current collector layer is reduced, the thickness of the tab element is approximately the same as for conventional stacked-cell battery topologies, which results in the tab element being recessed into the anode to preserve its thickness. By reducing the thickness of the current collector layer and recessing the tab elements into the active material layer, battery capacity can be significantly increased. For example, there can be an increased energy density of about 10-15% for any given battery chemistry with the electrode assembly designs described herein. In fact, this manufacturing technique can improve the energy density for stacked-cell batteries to be on par or better than that of jelly-rolled batteries, especially for thinner battery form factors. Furthermore, thinner batteries can be created using this manufacturing technique for a given energy rating. This electrode assembly topology can also be used to enable irregularly-shaped batteries, as is described in further detail below. It should be noted that in some embodiments the tab element may be formed by the current collector layer as previously described.

Various example embodiments of electrode assemblies for stacked-cell battery configurations will now be discussed which incorporate a thinner current collector layer. It should be noted that the manufacturing process 100, variations thereof or alternative manufacturing processes can be used to produce the following electrode assemblies.

Figure 2A:
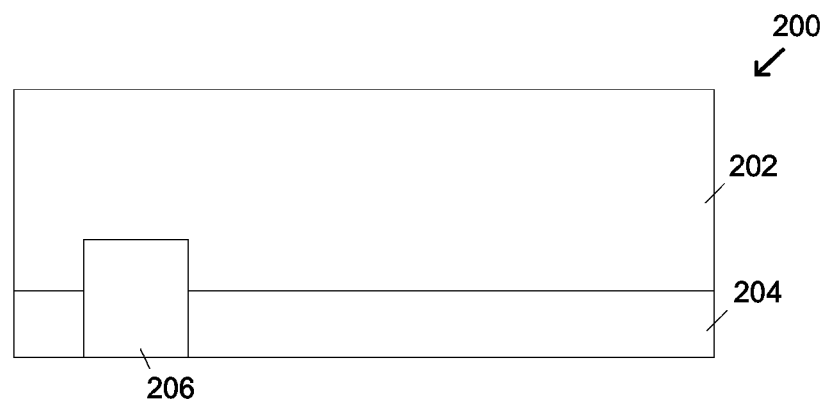
FIG. 2A is a side view of an example embodiment of an electrode assembly for a stacked-cell battery.

Referring now to FIG. 2A, shown therein is a side view of an example embodiment of an electrode assembly 200 for a battery. The electrode assembly 200 comprises an active material layer 202, a current collector layer 204 and a tab element 206. The electrode assembly 200 can be used to provide a cathode or anode of a battery cell. At least a portion of the tab element 206 is located within the active material layer 202 so that the current collector layer 204 can have a reduced thickness.

The active material layer 202 has a recess that is formed at its outer surface. The recess extends from a side facet of the active material layer 202 toward an interior portion of the active material layer 202 in a direction that is generally parallel to an end facet of the active material layer 202. The recess is also formed in the active material layer 202 such that it is spaced apart from an end facet of the active material layer 202. In this example, the recess has a rectangular profile however other profiles can be used in other embodiments.

In this example and the other example embodiments described herein, the location of the recess can be varied along the side facet. Also, in this example and the other examples described herein, there can be other embodiments in which the recess can be extend to a front or end facet of the electrode assembly. In addition, in this example and the other examples described herein, there can be other embodiments in which there can be multiple recesses with each recess extending to a similar facet or to different facets of the electrode assembly in a linear or non-linear pattern.

The active material layer 202 comprises an appropriate material such that the electrode assembly 200 acts as an anode or cathode as the case may be. For instance, graphite can be used to provide an anode and lithium cobalt dioxide can be used to provide a cathode. There are also a number of other commercially viable possibilities as is known by those skilled in the art. In at least some cases, the active material layer 202 is made from material that is mechanically self-stabilizing at ambient temperatures such as, but not limited to, polymer or gel electrolytes that are used in current Lithium polymer batteries.

The current collector layer 204 is supported on, and in electrical contact with, the outer surface of the active material layer 202. The current collector layer 204 has a slot or recess to receive a portion of the tab element 206. Metal deposition can be used to form the current collector layer 204 on the active material layer 202. In at least some cases, metal deposition can be done such that the current collector layer 204 is substantially continuous on the active material layer 202, which may provide for a more reliable contact between the current collector layer 204 and the tab element 206. In this example, the outer surface of the tab element 206 can be flush with the current collector layer 204 or can be further recessed into the active material layer 202 such that the current collector layer 204 is formed on top of it. In alternative embodiments, there can be different vertical profiles for the contact surfaces of the current collector layer 204 and the tab element 206 which may provide certain advantages. For example, in some cases where there is higher current flow for high-power batteries, the surfaces of the current collector layer 204 and the tab element 206 which are in contact may be sloped or curved to reduce current density in certain areas that would otherwise be at risk of "burning out" due to high current flow.

The tab element 206 is supported partially within the recess of the active material layer 202 such that the tab element 206 is in electrical contact with the current collector layer 204. Accordingly, the tab element 206 and the portions of the current collector layer 204 and the active material layer 202 that form the recess have complementary surface profiles. In at least some cases, the tab element is bonded to the current collector layer to provide an ohmic contact therebetween. In this example embodiment, the tab element 206 can be shaped to protrude away from the side facet of the active material layer 202 to provide electrical connectivity with an external terminal of the battery or with another electrical connection, such as possibly an intermediate electrical connection with another battery cell. It can also be seen in this example embodiment that the current collector layer 204 has a thickness that is less than the thickness of the tab element 206.

It should be noted that the tab element 206 can be in different locations in alternative embodiments. The tab element 206 can be extended to the side, end or front facets of the electrode assembly 200 and can be located at any position along these facets although the corners may result in the highest current density and so it may be better to locate the tab element 206 at approximately the center of a facet of the electrode assembly 200 in some cases. Additionally, multiple positive and negative tab elements can be used in one or more electrode assemblies. The tab elements may be connected together as an overlay, but this not an absolute requirement.

It should also be noted that two electrode assemblies are used to form a battery cell in which case there are two electrode assemblies 200 with an electrolyte material (not shown) in between them to allow electrons to flow between the two electrode assemblies. The active material layers are made of different materials so that one electrode assembly acts as an anode and the other electrode assembly acts as a cathode.

Figure 2B:
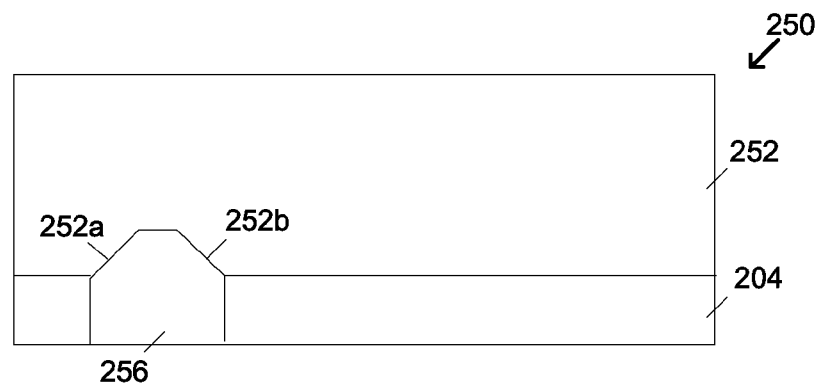
FIG. 2B is a side view of another example embodiment of an electrode assembly for a stacked-cell battery.

Referring now to FIG. 2B, shown therein is a side view of another example embodiment of an electrode assembly 250 for a battery. The electrode assembly 250 comprises an active material layer 252, a current collector layer 204 and a tab element 256. In this case, the recess is formed such that the side walls 252a and 252b forming the recess within the active material layer 252 are sloped. In this case, the tab element 256 has complimentary sloped portions to fit within the recess area of the active material layer 252.

Figure 3A:
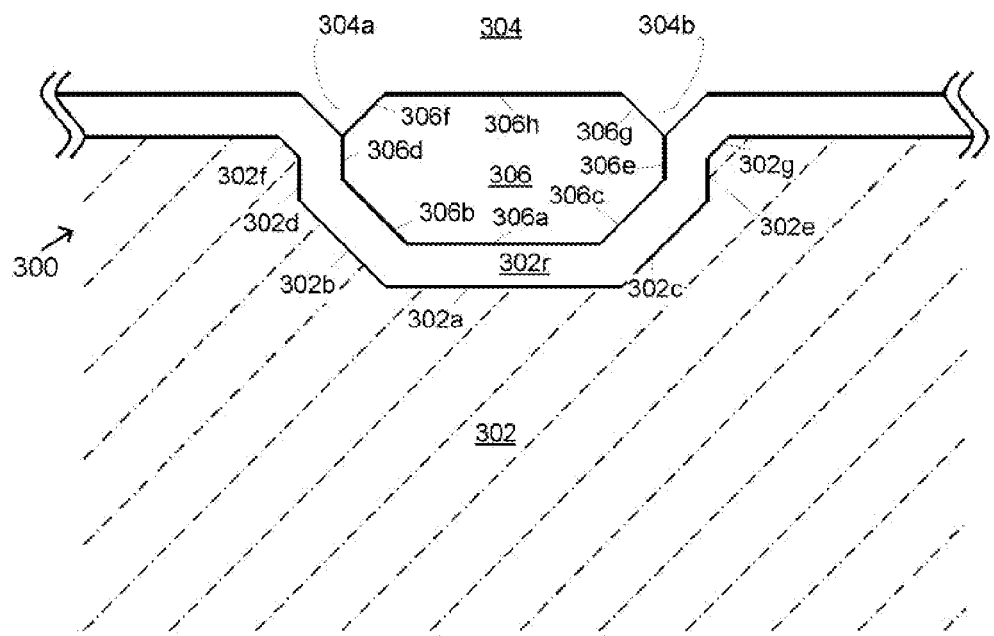
FIG. 3A is a side view of a portion of another example embodiment of an electrode assembly for a stacked-cell battery.

Referring now to FIG. 3A, shown therein is a side view of a portion of another example embodiment of an electrode assembly 300 comprising an active material layer 302, a current collector layer 304 and a tab element 306. The active material layer 302 has a recess 302r that is shaped like a bisected octagon with upper ridges. The recess 302r is defined by a region of the active material layer 302 that comprises a flat floor portion 302a, angled lower sidewalls 302b and 302c, straight sidewalls 302d and 302e and upper ridge portions 302f and 302g. The walls 302a-302f do not necessarily have the same length but there may be alternative embodiments in which they do have the same length. The ridge portions 302f and 302g are generally between the recess 302r and an end and front facet of the electrode assembly 300 respectively. The ridge portions 302f and 302g end at a top surface that is generally planar with the outer surface of the active material layer 302. The top of the ridge portions 302f and 302g are generally at a higher elevation than the floor portion 302a of the recess 302r.

The tab element 306 has a flattened octagonal shape that is defined by walls 306a-306h. The walls 306a-306e have a complimentary shape to the area of the active material layer defined by the walls 302a-302e. In this case, the tab element 306 has upper inwardly angled walls 306f and 306g but in alternative embodiments these walls can be angled outwards to match the walls 302f and 302g of the active material layer 302 (which would also change the shape of the current collector layer 304 in this region of the recess).

In this example, the current collector layer 304 has downwardly extending triangular sections 304a and 304b. The triangular section 304a partially fills in the gap between the walls 302f and 306f and the triangular section 304b partially fills in the gap between the walls 302g and 306g. The non-planar regions could be used as tongue-and-groove guides in the stacking process and for overall mechanical stability of the multi-layer cell. However, there can be alternative embodiments with different shapes for the tab element 306 and the current collector layer 304 as is shown in FIG. 3B.

Figure 3B:
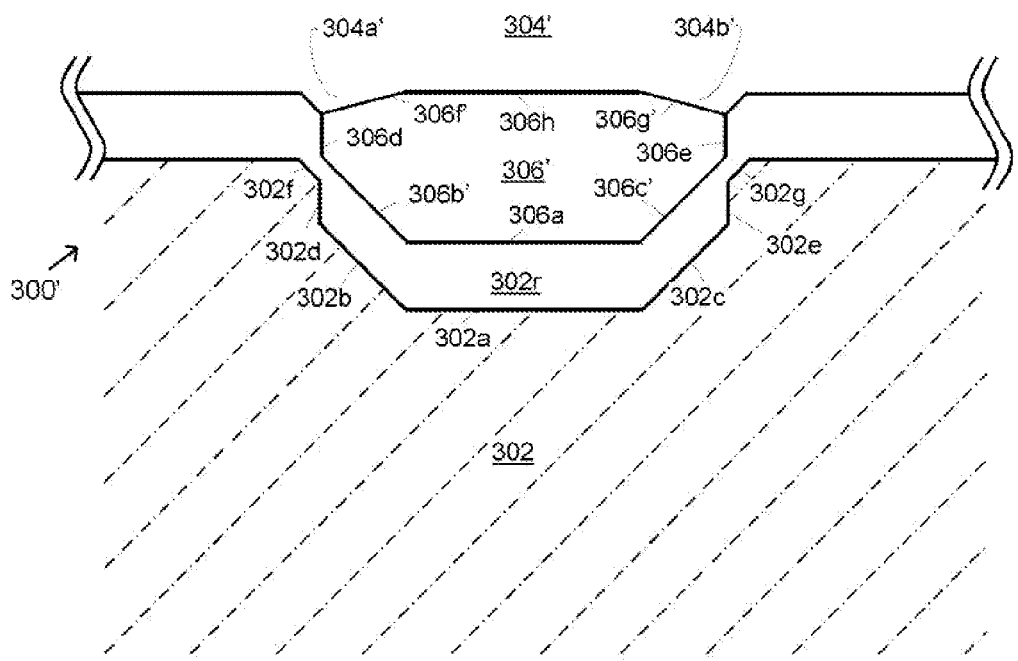
FIG. 3B is a side view of a portion of another example embodiment of an electrode assembly for a stacked-cell battery.
Figure 3C:
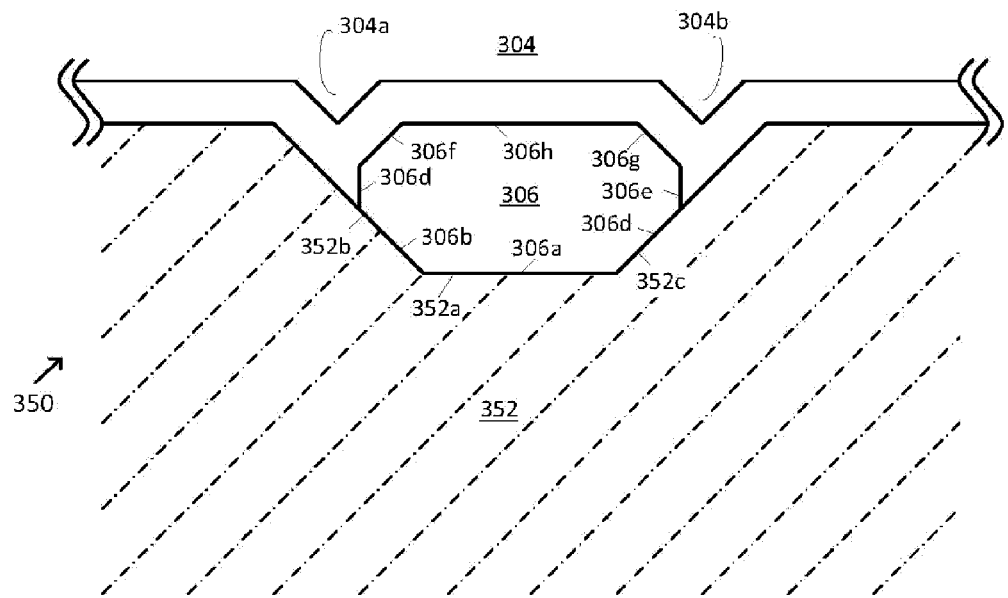
FIG. 3C is a side view of a portion of another example embodiment of an electrode assembly for a stacked-cell battery.
Figure 3D:
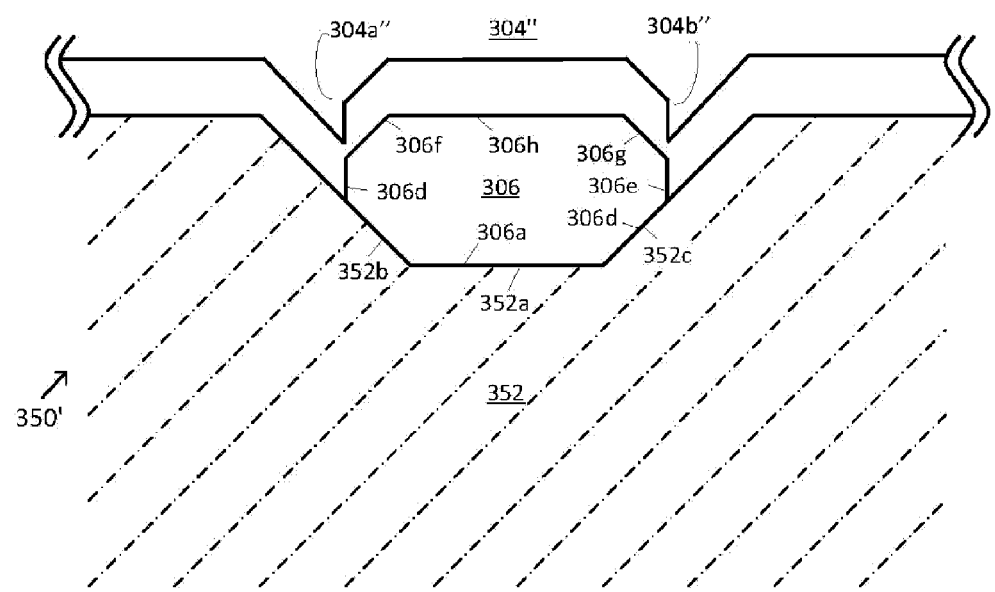
FIG. 3D is a side view of a portion of another example embodiment of an electrode assembly for a stacked-cell battery.

Referring now to FIG. 3C, shown therein is a side view of another example embodiment of an electrode assembly 350 comprising an active material layer 352, the current collector layer 304 and the tab element 306. The active material layer 352 has a recess that is shaped like a bisected hexagon. The recess is defined by a region of the active material layer 352 that comprises a flat floor portion 352a and angled sidewalls 352b and 352c. The walls 352a-352c do not necessarily have the same length but there may be alternative embodiments in which they do have the same length. The walls 306a-306c of the tab element 306 have a complimentary shape to the area of the active material layer defined by walls 302a-302c although walls 306b and 306c are not the same length as the walls 352b and 352c (however, in alternative embodiments, they may have the same length in which case there would be no sidewalls 306d-306g). The triangular section 304a partially fills in the gap between the walls 352b, 306d and 306f and the triangular section 304b partially fills in the gap between the walls 352c, 306e and 306g. In an alternative embodiment, the portions 304a and 304b can have a different shape so that there is no gap between these portions and the sidewalls 352b and 352c such as is shown in FIG. 3D for portions 304a" and 304b" of current collector layer 304". The configuration shown in FIGS. 3C-3D can occur in a process in which the tab element is attached first to the active material layer and the current collector layer is then formed by a deposition process which would fill the gap and cover all active material.

In FIGS. 3A-3D, at least a portion of the current collector layer 304 is supported between the active material layer 302/352 and the tab element 306 within the recess. In addition, it can be seen that the tab element 306 is generally supported between the active material layer 302/352 and the current collector layer 304 within the recess. Furthermore, a top surface of the tab element 306 is substantially planar with the outer surface of the active material layer 302/352; however, in other embodiments this need not necessarily be the case.

It should also be noted that in FIGS. 3A-3B, the tab element 306 is shown attached to the current collector layer 304 whereas in FIGS. 3C-3D the tab element 306 is shown attached to the active material layer 352. This is because the process of forming these layers can be reversed. Also, in alternative embodiments, it should be noted that the sidewalls of the elements of the electrode assemblies 300, 300', 350 and 350' near the recess may be curved.

Figure 4A:
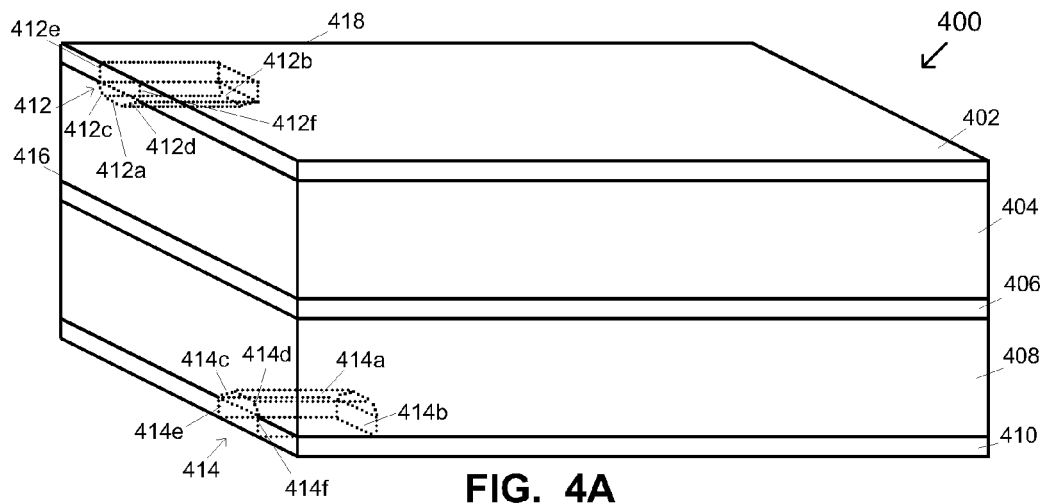
FIGS. 4A-4C are isometric, top and side views of another example embodiment of an electrode assembly for a stacked-cell battery shown without the tab elements for purposes of illustration.
Figure 4B:
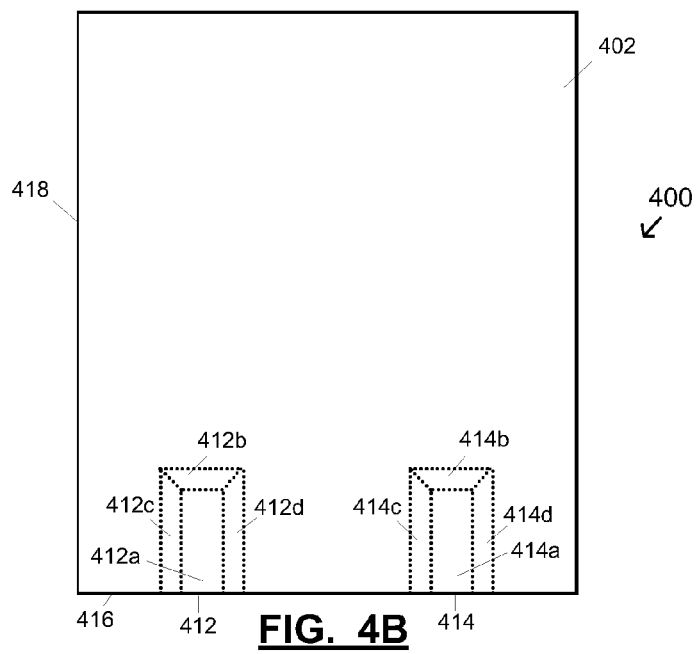
Figure 4C:
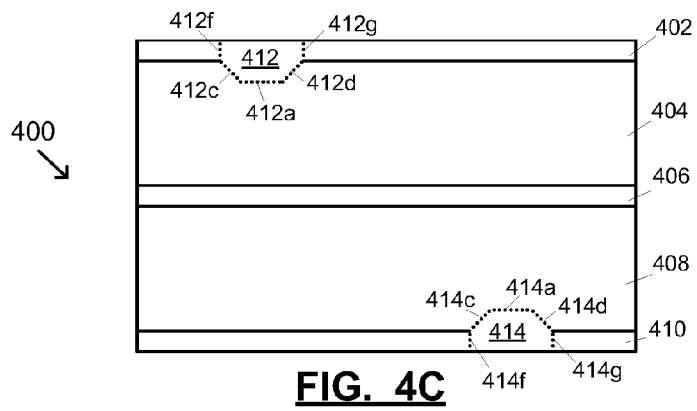

Referring now to FIGS. 4A-4C, shown therein are isometric, top and side views of another example embodiment of an electrode assembly 400 for a stacked-cell battery shown without the tab elements for purposes of illustration. The electrode assembly 400 comprises a first current collector 402, a first active material layer 404, an electrical insulation layer (i.e. a separator layer) 406, a second active material layer 408, a second current collector 410 as well as first and second recesses 412 and 414 to receive tab elements (not shown). The electrode assembly 400 has a side facet 416 and an end facet 418 that are both vertical and orthogonal to one another. The active material layers 404 and 408 and the current collector layers 402 and 410 are used to provide the same type of active portion for two different battery cells. For example, the current collector layer 402 and the active material layer 404 can provide an anode for one battery cell while the current collector layer 410 and the active material layer 408 can provide an anode for another battery cell. Alternatively, the current collector layer 402 and the active material layer 404 can provide a cathode for one battery cell while the current collector layer 410 and the active material layer 408 can provide a cathode for another battery cell.

The recess 412 comprises a floor portion 412a, an end wall 412b generally opposing the side facet 416 and adjoining the floor portion 412a to an outer surface of the active material layer 404. The recess 412 also comprises spaced apart side walls 412c and 412d extending between an end wall 412b of the recess and the side facet 416 and adjoining the floor portion 412a to the outer surface of the active material layer 404. The spaced apart side walls 412c and 412d are sloped inwardly toward the floor portion 412a. The end wall 412b is also sloped inwardly toward the floor portion 412a.

The recess 412 also comprises side walls 412e and 412f that extend vertically within the current collector layer 402 so that a tab element will be partially supported within the active material layer 404 and the current collector layer 402. The end wall of the portion of the recess within the current collector layer 402 can be vertical (as shown in FIG. 4A) or it can be sloped (as shown in FIG. 4B) in alternative embodiments.

Conventional electrode assemblies for stacked-cell battery configurations typically comprise pairs of anodes or cathodes separated by an electrical insulator, similar to that shown in FIG. 4A except with no recesses in the active material layer and thicker current collector layers. These conventional electrode assemblies are then stacked one on top of the other along with layers of electrolytes to form a stacked-cell battery. Tab elements for the anodes and cathodes are then formed on the same facet of the stacked-cell battery. The tab elements are then drawn out laterally a relatively large distance away from the stacked electrode assemblies and joined together in order to be connected to a Printed Circuit Board (PCB) or a Protection Circuit Module (PCM). The area between the stacked electrode assemblies and the edge of the PCB or PCM is often called the "Great Ears", which wastes significant volume within the battery because the tab elements can't be densely formed together in the great ears region. This is partly done to avoid breaking the tab elements due to the mechanical stresses that are created from leading them away from the face of the electrode assemblies and connecting them with one another. This is also partly due to the fact that conventional practice is not to insulate the tab elements since the tab elements are of the same polarity with the opposite polarity tab elements being physically separated and distant. Consequently, the tab elements would have to run a certain length out from the face of the battery stack before being deformed in order to avoid shorting out the anodes and cathodes of a battery cell, which would likely be catastrophic for the stacked-cell battery. In addition, it is difficult to put a seal on the "great ears" region to insulate the tab elements assuming that the battery cells are stacked such that those with opposite polarity tab elements are stacked on top of each other for EMI reduction. Accordingly, it is prohibitively expensive to insulate the "great ears" with conventional technology. Perhaps more importantly, it may not help to do so because proximity to opposite polarity conductors is not the primary limit to space reduction in the "great ears" configuration. While the great ears region may be on the order of several millimeters, this issue is important as this region may take up 2 to 10% of the volume in a typical stacked-cell battery. Given constraints in the sizes of batteries, especially for use in mobile and hand-held devices, this wasted space will reduce the volume of the active portion of the battery, which will require disposable batteries to be replaced more often or rechargeable batteries to be recharged more often. Furthermore, with this conventional configuration of tab elements, it is difficult to make a connection to a second stacked-cell battery.

The inventors have found that a way to overcome the issue with the great ears region is to form the tab elements such that they are adjacent to one or more layers in the electrode assembly and/or a facet of the electrode assembly. In other words, the tab elements can be positioned in at least one of the following ways: flush to an outer surface of an electrode assembly, along an outer surface of an active material layer that forms part of an anode or a cathode or along a surface of the current collector layer that forms part of an anode or cathode. The tab elements may also be embedded into the electrolyte material in between two electrode assemblies. This approach is more flexible than conventional techniques as it provides more connection options since the tab elements can then be extended on whichever sides are most convenient for the final product design rather than be limited by the battery design as is done in conventional techniques. In addition, this approach also allows for the PCB or PCM to be positioned with improved proximity to the stacked-cell battery, thereby reducing the space that was previously occupied by the great ears. In fact, the volume of the region where a stacked-cell battery is connected to a PCB or PCM can be reduced to less than 2% of the volume of the stacked-cell battery with this technique. This recovered space allows for a smaller battery pack (with the same battery capacity) or increased battery capacity (e.g. 10-15% increased capacity) within the same battery pack volume. Furthermore, this approach allows a PCB or PCM to be connected to the stacked-cell battery such that it is vertically-oriented instead of horizontally-oriented in a "patio" configuration which takes up additional space.

Figure 5A:
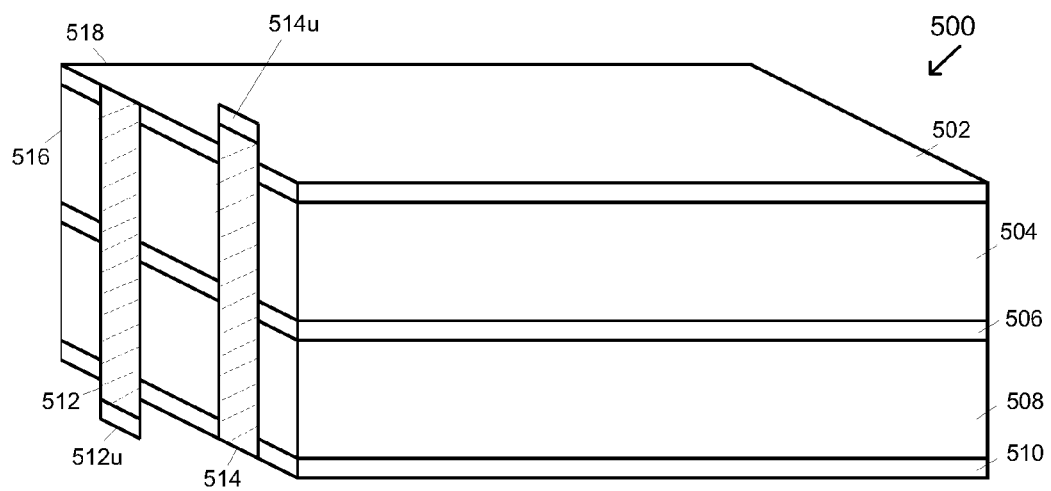
FIGS. 5A-5C are isometric, top and side views of another example embodiment of an electrode assembly for a stacked-cell battery.
Figure 5B:
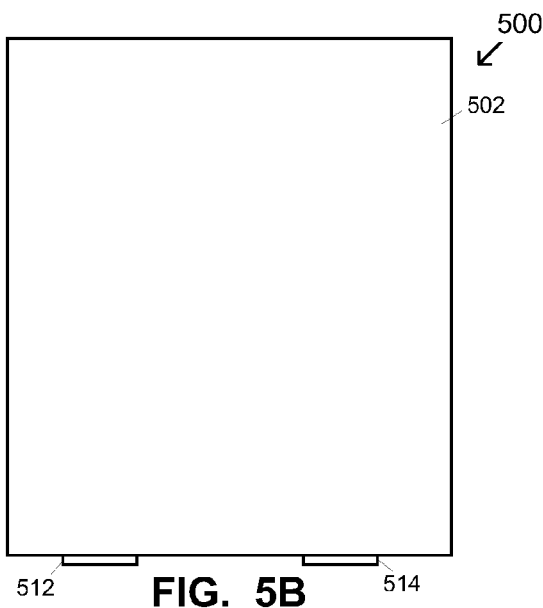
Figure 5C:
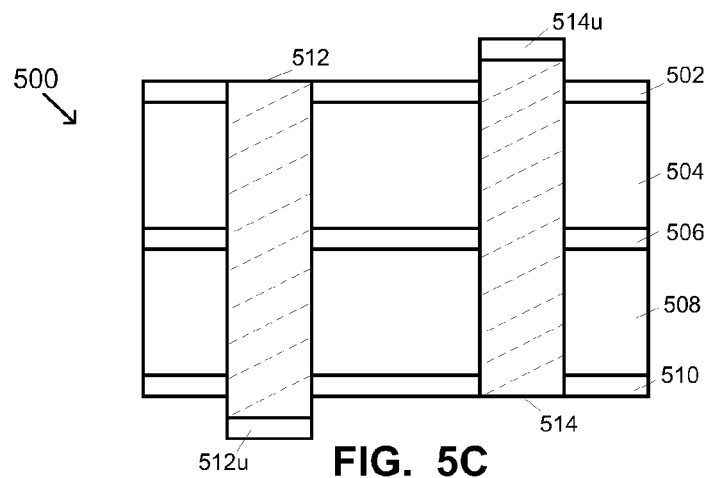

Referring now to FIGS. 5A-5C, shown therein are isometric, top and side views of another example embodiment of an electrode assembly 500 for a stacked-cell battery. The electrode assembly 500 comprises a first current collector layer 502, a first active material layer 504, an insulator 506, a second active material layer 508, a second current collector layer 510 and first and second tab elements 512 and 514. The current collector layer 502 is adjacent to and in electrical contact with an outer surface of the first active material layer 504. The layered elements of the electrode assembly 500 generally have a side facet 516 and an end facet 518.

The first and second tab elements 512 and 514 have insulated portions that are represented by cross-hatching and uninsulated portions 512u and 514u respectively. The tab element 512 has an end lead portion (not shown) that is in electrical contact with at least one of the first active material layer 504 and the first current collector layer 502. The tab element 514 has an end lead portion (not shown) that is in electrical contact with at least one of the second active material layer 508 and the second current collector layer 510. The tab elements 512 and 514 also have second lead portions (in this case side lead portions) that extend away from the end lead portions and are substantially adjacent to side facets 516 of the first and second active material layers 504 and 508. Portions of the insulated regions of the tab elements 512 and 514 provide an insulative layer that covers an inner contact area of the second lead portions of the tab elements 512 and 514 to electrically insulate them from other regions of the electrode assembly 500. The uninsulated portions 512u and 514u of the tab elements 512 and 514 provide an electrical connection to the electrode assembly 500 such that the electrode assembly 500 can be electrically connected to an external terminal of the stacked-cell battery or to another electrode assembly stack in a multi-stack battery.

The tab elements 512 and 514 can be made from different types of materials such as, but not limited to, nickel and aluminum for example. In some cases, the tab elements can be made from polymer materials that dissolve in the event of a short, thereby assuring safety as is known to those skilled in the art. For example, bromine may be used.

The tab elements 512 and 514 can be pre-coated in an insulative polymer material and then bonded to the current collector layers 502 and 510 respectively using a weld or other thermal/ohmic connection. The polymer material insulates the tab elements 512 and 514 from other battery cell layers and, in particular, the tab elements 512 and 514 are insulated from the opposite electrode assembly from which the tab elements 512 and 514 originate. Thus, if a given tab element is connected to a current collector layer of an anode, the polymer material insulates the given tab element from the cathode that completes the battery cell to prevent electrical short circuiting.

In order to insulate a given tab element, one option can be to coat the entire tab element with the polymer material and then cut away at each end to provide uninsulated regions for electrically connecting to the tab element. A second option is to only cut away the polymer material at the end of a given tab element that is being bonded to a PCB or PCM. A suitable bond with a current collector layer may then be formed, effectively, by consuming the polymer material at the other end of the given tab element during the bonding process itself. For example, the polymer material could melt away if the bonding is thermal or could, in fact, be electrochemically consumed if the bond is made using some sort of catalytic material.

Since the tab elements 512 and 514 are electrically insulated, it is now possible to deform the tab elements 512 and 514 to achieve much denser formations than were possible with the conventional stacked-cell batteries that had the "great ears" region. For example, as shown in FIGS. 5A-5C, it is now possible to deform the tab elements 512 and 514 right up to the face of the stacked-cell battery and thereby occupy very little volume. By compressing the space that was previously occupied by the "great ears", it is now possible to form a tighter seal around the battery cells. The result is a stronger seal, which makes the stacked-cell battery better able to withstand failure. Furthermore, the polymer coating applied to the tab elements 512 and 514 also adds a certain amount of mechanical stability, which is useful as the tab elements are now being deformed to a greater extent than was done conventionally. The polymer coating also allows for an increase in the radius of curvature wherever a given tab element or current collector layer is bent or contoured. Additional mechanical stability is due to the fact that the tab elements 512 and 514 are now adjacent to larger surfaces and in fact immobilized against a facet or an inner layer of the stacked-cell battery, which makes the stacked-cell battery more robust to withstand impact and shock or other mechanical stresses.

Figures 6A, 6B:
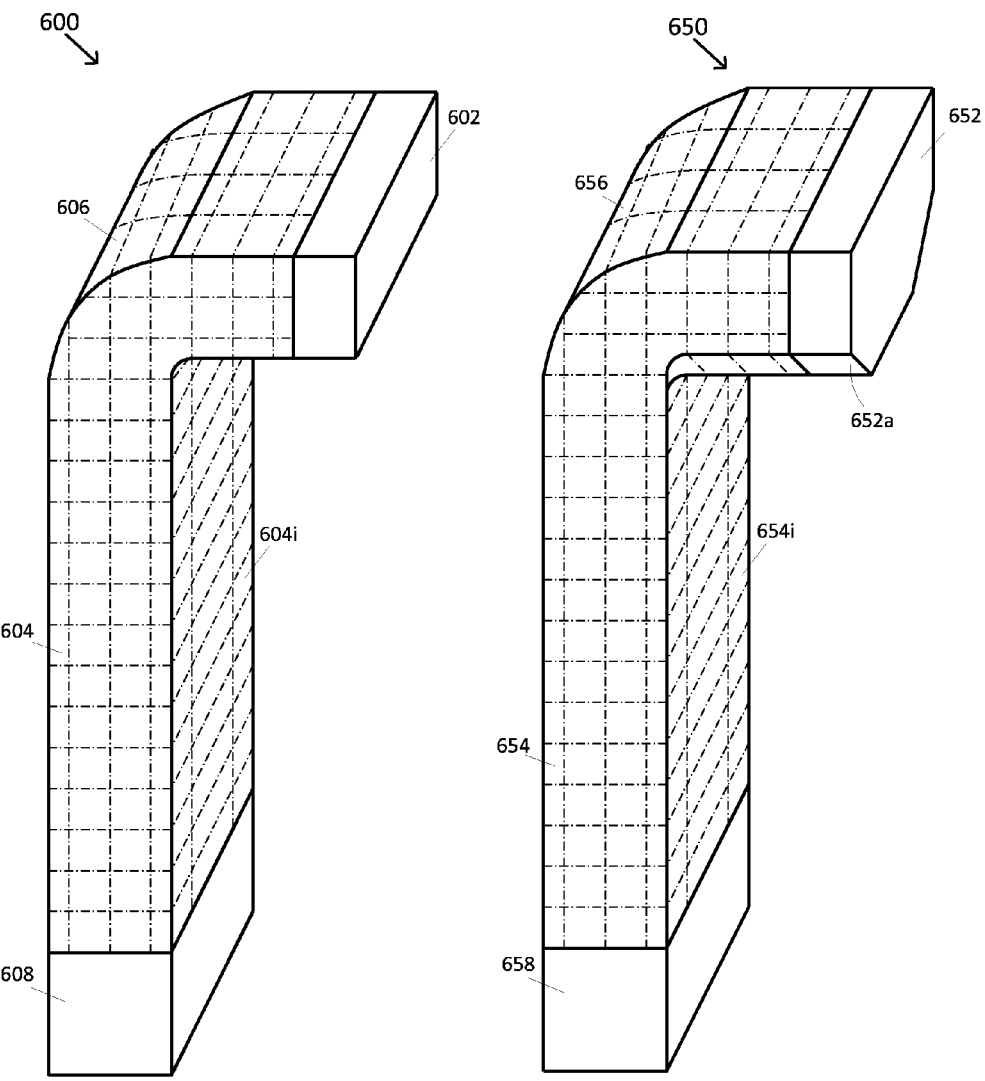
FIG. 6A is an isometric view of an example embodiment of a tab element for use with an electrode assembly.
FIG. 6B is an isometric view of another example embodiment of a tab element for use with an electrode assembly.

Referring now to FIG. 6A, shown therein is an isometric view of an example embodiment of a tab element 600 for use with an electrode assembly. The tab element 600 comprises an end lead portion 602, a side lead portion 604, a bend portion 606 and a second end lead portion 608. The bend portion 606 adjoins the end lead portion 602 and the side lead portion 604. The bend portion 606 is formed substantially into a right angle so that the end lead portion 602 can extend into an electrode assembly to provide an electrical contact with at least one of an active material layer and a first current collector layer (shown in more detail in FIG. 8). A portion of the tab element 600 has an insulative layer as shown by the cross-hatched region. The insulative layer further covers the first bend portion 606 of the tab element 600. The insulative layer comprises a polymer deposition. A periphery of the side lead portion 604 is substantially encompassed by the polymer deposition along a length of an inner contact area 604i that will be substantially flush to an outer side facet of an electrode assembly. The tab element 600 can be used in embodiments in which the end lead portion 602 is received on the surface of an active material layer and juxtaposed to an adjacent current collector layer. Alternatively, the tab element 600 can be used in embodiments in which the active material layer has a recess to receive at least a portion of the end lead 602.

Referring now to FIG. 6B, shown therein is an isometric view of another example embodiment of a tab element 650 for use with an electrode assembly. The tab element 650 comprises an end lead portion 652, a side lead portion 654, a bend portion 656 and a second end lead portion 658. The tab element 650 is also covered with an insulative layer and is similar to the tab element 600 except for the additional portion 652a which gives the end lead portion 652 a hexagonal cross-section. The tab element 650 can be used in embodiments in which the end lead portion 652 is received on the surface of an active material layer. Alternatively, the tab element 650 can be used in embodiments in which an active material layer has a recess to receive at least a portion of the end lead portion 652.

Figure 7:
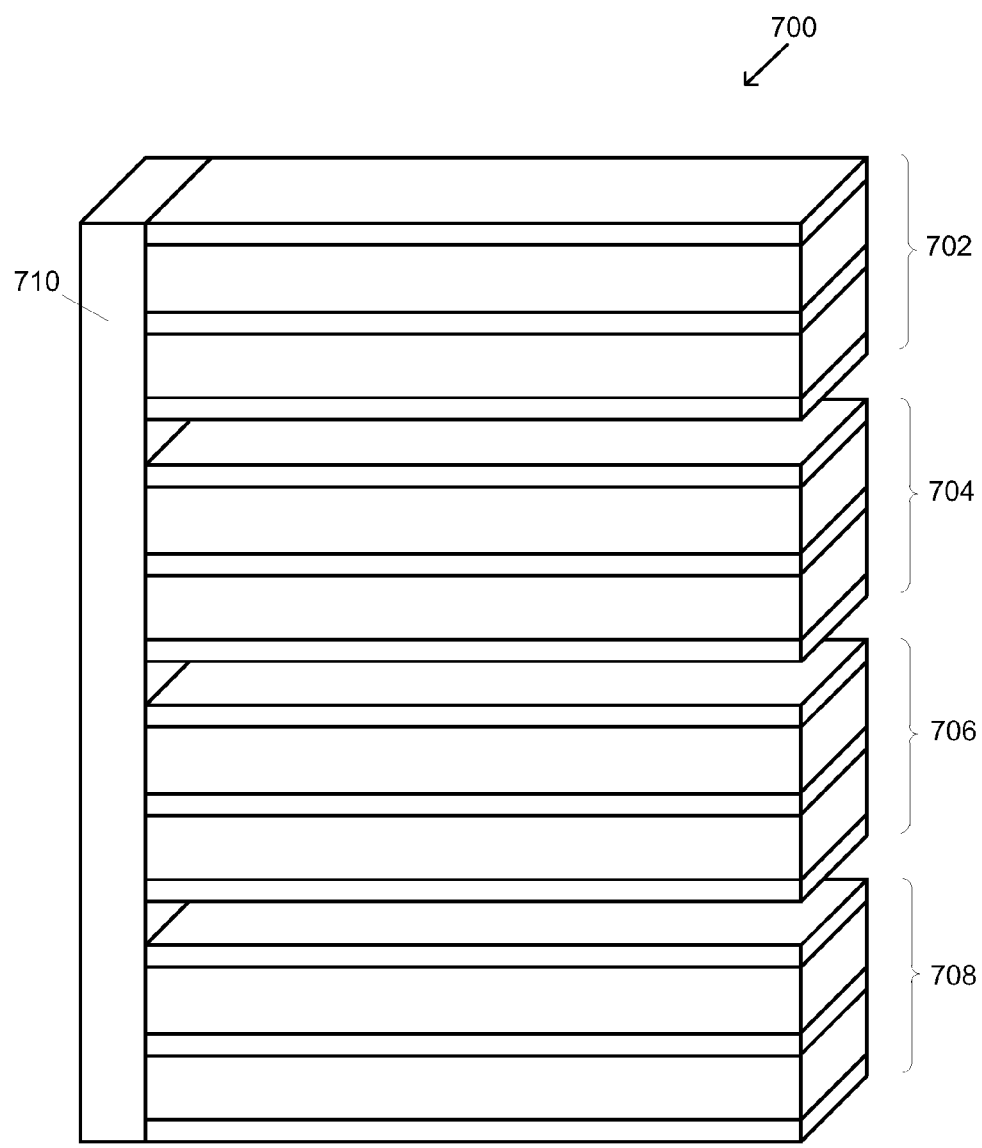
FIG. 7 is an isometric view of an example embodiment of a stacked-cell battery using the electrode assemblies described herein.

Referring now to FIG. 7, shown therein is an isometric view of an example embodiment of a stacked-cell battery 700 using the electrode assemblies described herein. The stacked-cell battery 700 comprises a plurality of electrode assemblies 702, 704, 706 and 708. The stacked-cell battery further comprises a backing substrate 710 that is applied to a side facet of the electrode assemblies 702, 704, 706 and 708 so that any side lead portions of the tab elements are compactly housed between the electrode assemblies 702, 704, 706 and 708 and the backing substrate 710.

Figure 8:
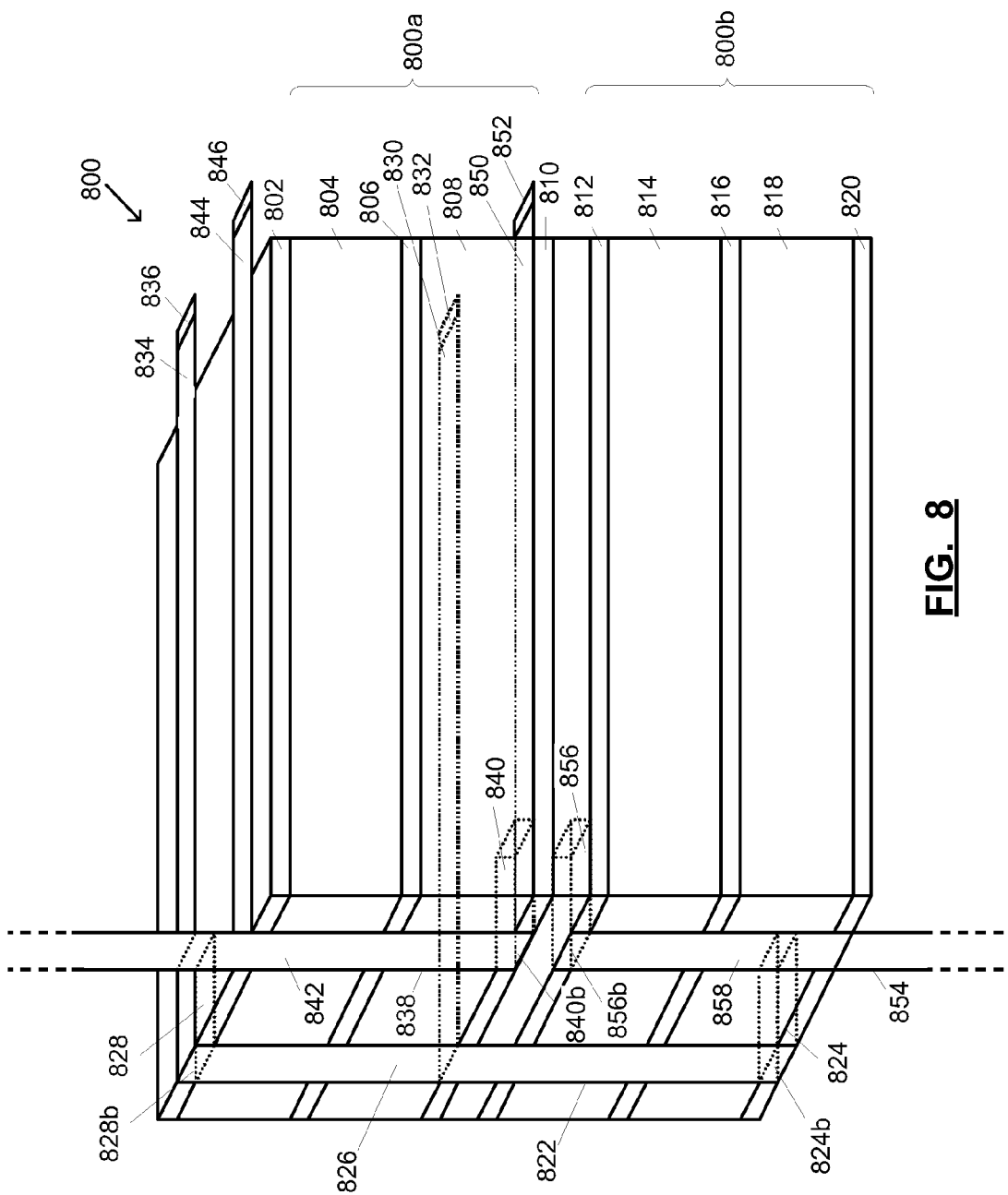
FIG. 8 is an isometric view of a portion of an example embodiment of an electrode stack assembly having two electrode assemblies and various example configurations of tab elements for use in a stacked-cell battery.

Referring now to FIG. 8, shown therein is an isometric view of a portion of an example embodiment of an electrode stack assembly 800 having two electrode assemblies 800a and 800b and various example configurations of tab elements for use in a stacked-cell battery. The electrode assembly 800a comprises a first current collector plate 802, a first active material layer 804, an insulative layer 806, a second active material layer 808 and a second current collector layer 810 all supported in the electrode assembly 800a. The second active material layer 808 and the second current collector layer 810 are both electrically insulated from the first active material layer 804 and the first current collector layer 802. The second electrode assembly 800b comprises a third current collector plate 812 and a third active material layer 814, an insulative layer 816, a fourth active material layer 818 and a fourth current collector layer 820 all supported in the electrode assembly 800b. The fourth active material layer 818 and the fourth current collector layer 820 are both electrically insulated from the third active material layer 814 and the third current collector layer 812. In this example, the first electrode assembly 800a and the second electrode assembly 800b are adjacently supported within the electrode stack assembly 800.

The electrode stack assembly 800 further comprises a first tab element 822 having a first end lead portion 824 in electrical contact with the fourth active material layer 818 and the fourth current collector layer 820. In alternative embodiments, the first tab element 822 can have a first electrical contact with at least one of the fourth active material layer 818 and the fourth current collector layer 820 and a second electrical connection with a portion of another electrode assembly or with another element (this applies to similar connections described below for other tab elements). The first tab element 822 also has an extended lead portion 826, which is a side lead portion that is substantially flush to a side facet of the electrode assemblies 800a and 800b. The first tab element 822 has a bend portion 824b that is formed substantially in a right angle to adjoin the first end lead portion 824 and the side lead portion 826.

The first tab element 822 further comprises another end lead portion 828 in electrical contact with the first active material layer 804 and the first current collector layer 802. The first tab element 822 also has a lateral lead portion 830 that extends away from the side lead portion 826 into the electrode assembly 800a and provides an electrical connection 832 to the electrode assembly 800a on a side opposite to the side on which the side lead portion 826 rests. The first tab element 822 also has another lateral lead portion 834 that extends away from the side lead portion 826 into the electrode assembly 800a and provides another electrical connection 836 to the electrode assembly 800a. The lateral lead portion 834 is adjacent to an outer surface of the current collector layer 802. The lateral lead portion 830 is between the outer surface of the active material layer 808 and the current collector layer 810. The first tab element 822 also has a second bend portion 828b adjoining the side lead portion 826 to the lateral lead portion 834 and the end lead portion 828 at an end of the side lead portion 826 that is opposite to the first bend portion 824b.

A first insulative layer covers an inner contact area of the side lead portion 826 to electrically insulate the tab element 826 from each of the second and third active material layers 808 and 814. The first and second bend portions 824b and 828b also have insulated layers except for where the end lead portions 824 and 828 make electrical contact with the respective active material layer and/or current collector layer.

The electrode stack assembly 800 further comprises a second tab element 838 having an end lead portion 840 in electrical contact with the second active material layer 808 and the second current collector layer 810. The second tab element 838 also has an extended lead portion 842, which is a side lead portion that is substantially flush to a side facet of the electrode assembly 800a. The second tab element 838 has a bend portion 840b that is formed substantially in a right angle to adjoin the end lead portion 840 and the side lead portion 842. The second tab element 838 also has a lateral lead portion 844 that extends away from the side lead portion 842 and provides an electrical connection 846 to the electrode assembly 800a on a side opposite to the side on which the side lead portion 842 rests. The second tab element 838 also has a second lateral lead portion 850 that extends away from the side lead portion 842 and provides an electrical connection 852 to the electrode assembly 800a. The lateral lead portion 850 extends into the electrode stack assembly 800 in between the first and second electrode assemblies 800a and 800b and on a similar surface as the lateral lead portion 830. In alternative embodiments, the lateral lead portion 850 can extend into the electrode stack assembly 800 in between the first and second electrode assemblies 800a and 800b and on an opposite surface of the same layer that the lateral lead portion 830 is on.

The electrode stack assembly 800 further comprises a third tab element 854 having an end lead portion 856 in electrical contact with the third active material layer 814 and the third current collector layer 812. The third tab element 854 also has an extended lead portion 858, which is a side lead portion that is substantially flush to a side facet of the electrode assembly 800b. The third tab element 854 has a bend portion 856b that is formed substantially in a right angle to adjoin the end lead portion 856 and the side lead portion 858. Although not shown here, the other end of the side lead portion 858 of the third tab element 854 can provide an electrical connection to the second electrode assembly 800b or the third tab element 854 can have a lateral lead portion as lead portions 850 or 844 to provide an electrical connection to the second electrode assembly 800b.

A second insulative layer covers an inner contact area of the side lead portion 842 to electrically insulate this portion of the tab element 838 from the first active material layer 804. Likewise an insulative layer covers an inner contact area of the side lead portion 858 to electrically insulate this portion of the tab element 854 from the fourth active material layer 818. The bend portions 840b and 856b also have insulated layers.

The side lead portions 842 and 858 can extend to other electrode assemblies that are above and below, respectively, the electrode assemblies 800a and 800b. In addition, since the tab elements are insulated, at least a portion of the side lead portions 842 and 858 can overlay the side lead portions of other tab elements.

It should be noted that the tab elements 822, 838 and 854 are similar to the tab elements 512 and 514 and thus the techniques described to insulate and connect the tab elements 512 and 514 to at least one of an active material layer and a current collector layer also apply to the tab elements 822, 838 and 854.

As opposed to conventional battery stacks, which were constrained to lead away from a common battery stack face and form the "great ears" region, the tab elements described herein can follow any 3-dimensional contour within a battery pack. The folded tab elements can also be used to make "local" connections, i.e., connections between different stacked-cell batteries within a single battery pack. The ability to lead the tab elements out from the stacked-cell battery following any arbitrary trajectory is what makes it possible to synthesize battery packs of arbitrary shape, piece by piece, from individual stacked-cell batteries. Therefore it is now possible to form arbitrary 3-dimensional shapes by combining multiple different stacked-cell batteries without wasting much space, whereas conventionally, because of past constraints, stacked-cell batteries were limited to rectangular geometries.

Referring now to FIGS. 9A-9E, shown therein are various example embodiments of battery pack configurations that are possible with the folded tab elements described herein. These example embodiments show battery packs with four different battery units (each unit can be a single separate stacked-cell battery). However, it should be noted that this concept is not limited to four battery units and this concept can be applied to more or less battery units and arranged in other geometric configurations.

Figure 9A:
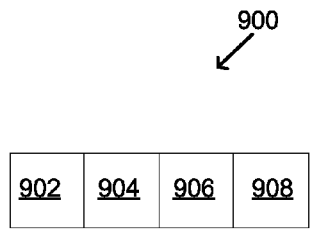
FIGS. 9A-9E show various example embodiments of battery pack configurations that are possible with the folded tab elements described herein.
Figure 9B:
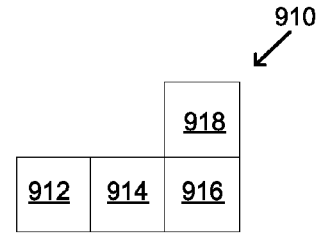
Figure 9C:
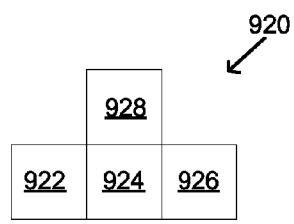
Figure 9D:
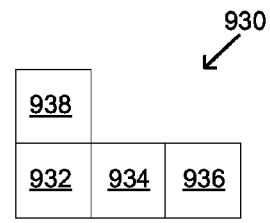
Figure 9E:
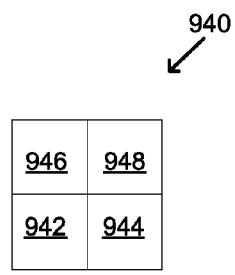

FIG. 9A shows a battery pack 900 with stacked-cell batteries 902, 904, 906 and 908 arranged in a linear configuration. FIG. 9B shows a battery pack 910 with stacked-cell batteries 912, 914, 916 and 918 arranged in an L-shape configuration. FIG. 9C shows a battery pack 920 with stacked-cell batteries 922, 924, 926 and 928 arranged in a triangle-shape configuration. FIG. 9D shows a battery pack 930 with stacked-cell batteries 932, 934, 936 and 938 arranged in a reverse L-shape configuration. FIG. 9E shows a battery pack 940 with stacked-cell batteries 942, 944, 946 and 948 arranged in a square-shape configuration.

The battery pack configurations shown in FIGS. 9A-9E are possible by running the insulated tab elements along the faces of the different battery units, in 3 dimensions, to a common outlet and/or by running tab elements in between surfaces within each stacked-cell battery to facilitate connection to one another. Being able to fabricate irregularly shaped batteries could be very useful to realize extra battery capacity in mobile device configurations that impose form factor constraints on the battery pack. For example, cell phone hardware may create a cavity within the phone casing that is not perfectly regular. However, with the tab elements and battery pack configurations described herein, the battery pack can be designed to fit to the cavity, rather than designing the cell phone hardware to accommodate a regular shaped battery pack.

It should be noted that the various embodiments and alternatives including the folded tab elements that were described with respect to FIGS. 5A-9 can be implemented alone or in conjunction with the various embodiments that have recessed tab elements described in conjunction with FIGS. 1-4C.

In addition, the various embodiments described herein of stacked-cell batteries that utilize folded tab elements can be used not only as an enabler for higher energy density batteries but also for batteries with magnetically quieter designs. This is due to the ability to overlay insulated tab elements on top of one another. If tab elements carrying current in different directions are overlaid, the magnetic fields generated by opposite going currents in each of the tab elements may at least partially cancel each other and reduce the overall magnetic field that is generated. Therefore, if all the tab elements in the stacked-cell battery can be "paired" with a tab element that is carrying a similar magnitude current but in the opposite direction then theoretically the tab elements should have a greatly reduced contribution to the magnetic field that is generated by the stacked-cell battery. This is important because the tab elements are often the main source of this magnetic field.

It should also be noted that the various embodiments described herein of stacked-cell batteries that utilize folded tab elements can be used to create safer batteries depending on the choice of insulating polymers that are used to insulate the tab elements. For example, the insulating polymers can be selected for "shutdown" characteristics in emergency situations. Polymers could be used to activate a destructive property that dissolves at least a portion of the tab element and the current collector layer to remove any elements that have short-circuited in order to shut down the problem. There are various ways to implement this feature as is known to those skilled in the art. For instance material that incorporates bromic acid can be used which is activated when the temperate of the material rises above a certain critical temperature (which can occur due to a short circuit for example).

It should also be noted that if, for whatever reason, a pair of electrodes of opposite polarity should short out, a very large current will begin to flow in the stacked-cell battery, including within the tab elements and the current collector layers. However, if the current collector layers are thin enough relative to the magnitude of the short circuit current, the current collector layers may actually break due to thermal and mechanical stresses. In effect, the current collector layers may double as fuses or circuit breakers. For example, if there is a short between one of the anodes and its corresponding cathode, then one of the corresponding current collector layers will burn and that cell will be shorted but it will also be isolated from the remainder of the stacked-cell battery which provides for safer operation. This feature can be enabled using recesses in the active material layer as described with respect to FIGS. 1 to 4C. To further enable this feature, the polymer coating provides additional mechanical stability to the tab elements and current collector layers, which allows for a reduction in thickness to make the current collector layers even more suitable for operation as fuses.

In addition, it should be noted that applying an insulating polymer coating on the tab elements makes it now possible to overlay the tab elements leading from electrodes of opposite polarity. For example, tab elements from cathodes may lead along a facet of the stacked-cell battery at a first layer and tab elements from anodes may lead along the same facet of the stacked-cell battery at a second layer at least partially on top of the first layer. By compacting and immobilizing the tab elements against the facet of the stacked-cell battery, more mechanical stability can be achieved, i.e., because there are now fewer parts leading away from or hanging off the facet of the stacked-cell battery that would undergo mechanical deformation due to shock.

Furthermore, since the tab elements leading from opposite polarity electrodes can be electrically insulated from each other with the design techniques described herein, there is less risk of shorting due to inadvertent contact, which then makes it possible to increase the number/density of tab elements in the stacked-cell battery. Increasing the number of tab elements will decrease the effective resistance of the battery pack. The additional tab elements also provide some redundancy when using more than one tab element for a given electrode assembly. This also reduces the maximum current density in the current collector which reduces its thickness requirement as well as the ESR of the electrode assembly. Accordingly, in case one or more of the tab elements should break during operation, the incremental change in effective series resistance will be smaller than if there were fewer parallel tab elements.

In one aspect, according to at least one example embodiment described herein, there is provided an electrode assembly for a stacked-cell battery. The electrode assembly comprises a first active material layer; a first current collector layer adjacent to and in electrical contact with an outer surface of the first active material layer; a tab element having an end lead portion and a second lead portion, the end lead portion being in electrical contact with at least one of the first active material layer and the first current collector layer, and the second lead portion extending away from the end lead portion and being substantially adjacent to a surface of at least one of the first active material layer and the first current collector layer and is adapted to provide an electrical connection to the electrode assembly; and an insulative layer covering an inner contact area of the second lead portion to electrically insulate this portion of the tab element.

In at least some cases, the second lead portion is a side lead portion that is substantially flush to a side facet of the electrode assembly.

In at least some cases, the second lead portion is a lateral lead portion extending away from the end lead portion and between the outer surface of the first active material layer and the first current collector layer.

In at least some cases, the second lead portion is a lateral lead portion extending away from the end lead portion and adjacent to an outer surface of the first current collector layer.

In at least some cases, the electrode assembly further comprises a second active material layer and a second current collector layer both supported in the stacked-cell battery and both being electrically insulated from the first active material layer and the first current collector layer, and wherein the second lead portion of the tab element is a side lead portion substantially adjacent to a side facet of the second active material layer.

In at least some cases, the electrode assembly further comprises a backing substrate applied to a side facet of the electrode assembly so that the side lead portion of the tab element is compactly housed between the electrode assembly and the backing substrate.

In at least some cases, the tab element further comprises a first bend portion adjoining the end lead portion and the side lead portion.

In at least some cases, the first bend portion is formed substantially into a right angle so that the end lead portion extends into the electrode assembly to provide the electrical contact with at least one of the first active material layer and the first current collector layer.

In at least some cases, the insulative layer further covers the first bend portion of the tab element.

In at least some cases, the tab element further comprises a lateral lead portion extending away from the side lead portion adjacent the second active material layer.

In at least some cases, the tab element comprises a second bend portion adjoining the side lead portion to the lateral lead portion at an end of the side lead portion opposite to the first bend portion.

In at least some cases, the insulative layer comprises a polymer deposition applied to the insulated portion of the tab element.

In at least some cases, a periphery of the second lead portion is substantially encompassed by the polymer deposition along a length of the inner contact area.

In another aspect, according to at least one example embodiment described herein, there is provided an electrode stack assembly for a stacked-cell battery. The electrode stack assembly comprises at least first and second electrode assemblies, the first electrode assembly comprising a first active material layer and a first current collector layer both supported in the electrode stack assembly, a second active material layer and a second current collector layer both supported in the electrode stack assembly and both electrically insulated from the first active material layer and the first current collector layer, and the second electrode assembly comprising a third active material layer and a third current collector layer both supported in the electrode stack assembly and a fourth active material layer and a fourth current collector layer both supported in the electrode stack assembly and both electrically insulated from the third active material layer and the third current collector layer; a first tab element having a first end lead portion in electrical contact with at least one of the first active material layer and the first current collector layer and a first extended lead portion to provide a first electrical connection to the first electrode assembly, the first extended lead portion extending away from the first end lead portion and being substantially adjacent to a surface of at least one of the first active material layer and the first current collector layer; a first insulative layer covering a first inner contact area of the first extended lead portion to electrically insulate the first tab element from each of the second and third active material layers; a second tab element having a second end lead portion in electrical contact with at least one of the third active material layer and the third current collector layer, and a second extended lead portion to provide an electrical connection to the second electrode assembly, the second extended lead portion extending away from the second end lead portion and being substantially adjacent to a surface of at least one of the third active material layer and the third current collector layer; and a second insulative layer covering a second inner contact area of the second extended lead portion to electrically insulate the second tab element from the fourth active material layer.

In at least some cases, the electrode stack assembly further comprises a third tab element having a third end lead portion in electrical contact with at least one of the second active material layer and the second current collector layer, and a third extended lead portion to provide a second electrical connection to the second electrode assembly, the third extended lead portion extending away from the third end lead portion and being substantially adjacent to a surface of at least one of the second active material layer and the second current collector layer; and a third insulative layer covering a third inner contact area of the third extended lead portion to electrically insulate the third tab element from the first active material layer.

In at least some cases, at least one the first and second extended lead portions is a side lead portion that is substantially flush to a side facet of the electrode assembly.

In at least some cases, at least one of the first and second extended lead portions is a lateral lead portion that is between the outer surface of one of the active material layers and the adjacent current collector layer.

In at least some cases, at least one of the first and second extended lead portions is a lateral lead portion that is adjacent to an outer surface of one of the current collector layers.

In at least some cases, at least a portion of the first and second side lead portions are overlying a portion of a tab element.

In at least some cases, the first tab element comprises a lateral lead portion extending into the electrode stack assembly between the first and second electrode assemblies.

In at least some cases, the second tab element comprises a second lateral lead portion extending into the electrode stack assembly between the first and second electrode assemblies and on a similar surface as the first lateral lead portion.

In at least some cases, the second tab element comprises a second lateral lead portion extending into the electrode stack assembly between the first and second electrode assemblies and on an opposite surface of a similar layer as the first lateral lead portion.

In at least some cases, the electrode stack assembly further comprises a backing substrate applied to a side facet of the electrode stack assembly so that side lead portions of the tab elements are compactly housed between the electrode stack assembly and the backing substrate.

In at least some cases, the first or second tab element with the side lead portion further comprises a first bend portion formed substantially in a right angle to adjoin the end lead portion and the side lead portion, and the first bend portion has an insulated layer.

In at least some cases, the first or second tab element with the side lead portion further comprises a lateral lead portion extending away from the side lead portion and a second bend portion adjoining the side lead portion to the lateral lead portion at an end of the side lead portion opposite to the first bend portion, and the second bend portion has an insulated layer.

It should be understood that various modifications can be made to the embodiments described and illustrated herein, without departing from the embodiments, the general scope of which is defined in the appended claims.

The invention claimed is:

1. An electrode assembly for a stacked-cell battery, wherein the electrode assembly comprises:
   a first active material layer;
   a first current collector layer adjacent to and in electrical contact with an outer surface of the first active material layer;
   a tab element having an end lead portion and an extended lead portion,
      the end lead portion being in electrical contact with at least one of the first active material layer and the first current collector layer, and
      the extended lead portion having first and second portions, the first portion extending away from the end lead portion to a periphery of a facet of the electrode assembly and being substantially flush to the facet of the electrode assembly, and the second portion extending away from the first portion and past the periphery of the facet of the electrode assembly, the extended lead portion being adapted to provide an electrical connection to the electrode assembly; and
   an insulative layer covering an inner contact area of the extended lead portion to electrically insulate this portion of the tab element.

2. The electrode assembly of claim 1, wherein the extended lead portion is a side lead portion, and the facet of the electrode assembly is a side facet of the electrode assembly.

3. The electrode assembly of claim 2, wherein the electrode assembly further comprises a backing substrate applied to the side facet of the electrode assembly so that the side lead portion of the tab element is compactly housed between the electrode assembly and the backing substrate.

4. The electrode assembly of claim 2, wherein the tab element further comprises a first bend portion adjoining the end lead portion and the side lead portion.

5. The electrode assembly of claim 4, wherein the first bend portion is formed substantially into a right angle so that the end lead portion extends into the electrode assembly to provide the electrical contact with at least one of the first active material layer and the first current collector layer.

6. The electrode assembly of claim 4, wherein the insulative layer further covers the first bend portion of the tab element.

7. The electrode assembly of claim 1, wherein the electrode assembly further comprises a second active material layer and a second current collector layer both supported in the stacked-cell battery and both being electrically insulated from the first active material layer and the first current collector layer, and wherein the extended lead portion is a side lead portion and the first portion of the extended lead portion is substantially flush to a side facet of the second active material layer.

8. The electrode assembly of claim 7, wherein the tab element further comprises a lateral lead portion extending away from the side lead portion adjacent the second active material layer.

9. The electrode assembly of claim 8, wherein the tab element further comprises a first bend portion adjoining the end lead portion and the side lead portion, and a second bend portion adjoining the side lead portion to the lateral lead portion at an end of the side lead portion opposite to the first bend portion.

10. The electrode assembly of claim 1, wherein the insulative layer comprises a polymer deposition applied to the insulated portion of the tab element.

11. The electrode assembly of claim 10, wherein a periphery of the extended lead portion is substantially encompassed by the polymer deposition along a length of the inner contact area.

12. An electrode stack assembly for a stacked-cell battery, the electrode stack assembly comprising:
   at least first and second electrode assemblies, the first electrode assembly comprising a first active material layer and a first current collector layer both supported in the electrode stack assembly, a second active material layer and a second current collector layer both supported in the electrode stack assembly and both electrically insulated from the first active material layer and the first current collector layer, and the second electrode assembly comprising a third active material layer and a third current collector layer both supported in the electrode stack assembly and a fourth active material layer and a fourth current collector layer both supported in the electrode stack assembly and both electrically insulated from the third active material layer and the third current collector layer;
   a first tab element having a first end lead portion in electrical contact with at least one of the first active material layer and the first current collector layer and a first extended lead portion to provide a first electrical connection to the first electrode assembly, the first extended lead portion extending away from the first end lead portion and being substantially adjacent to a surface of at least one of the first active material layer and the first current collector layer;
   a first insulative layer covering a first inner contact area of the first extended lead portion to electrically insulate the first tab element from each of the second and third active material layers;
   a second tab element having a second end lead portion in electrical contact with at least one of the third active material layer and the third current collector layer, and a second extended lead portion to provide an electrical connection to the second electrode assembly, the second extended lead portion extending away from the second end lead portion and being substantially adjacent to a surface of at least one of the third active material layer and the third current collector layer; and a second insulative layer covering a second inner contact area of the second extended lead portion to electrically insulate the second tab element from the fourth active material layer.

13. The electrode stack assembly of claim 12, further comprising:

a third tab element having a third end lead portion in electrical contact with at least one of the second active material layer and the second current collector layer, and a third extended lead portion to provide a second electrical connection to the second electrode assembly, the third extended lead portion extending away from the third end lead portion and being substantially adjacent to a surface of at least one of the second active material layer and the second current collector layer; and a third insulative layer covering a third inner contact area of the third extended lead portion to electrically insulate the third tab element from the first active material layer.

14. The electrode stack assembly of claim 12, wherein at least one the first and second extended lead portions is a side lead portion that is substantially flush to a side facet of the electrode assembly.

15. The electrode stack assembly of claim 14, wherein the electrode stack assembly further comprises a backing substrate applied to a side facet of the electrode stack assembly so that side lead portions of the tab elements are compactly housed between the electrode stack assembly and the backing substrate.

16. The electrode stack assembly of claim 14, wherein the first or second tab element with the side lead portion further comprises a first bend portion formed substantially in a right angle to adjoin the end lead portion and the side lead portion, and the first bend portion has an insulated layer.

17. The electrode stack assembly of claim 16, wherein the first or second tab element with the side lead portion further comprises a lateral lead portion extending away from the side lead portion and a second bend portion adjoining the side lead portion to the lateral lead portion at an end of the side lead portion opposite to the first bend portion, and the second bend portion has an insulated layer.

18. The electrode stack assembly of claim 12, wherein at least one of the first and second extended lead portions is a lateral lead portion that is between the outer surface of one of the active material layers and the adjacent current collector layer.

19. The electrode stack assembly of claim 12, wherein at least one of the first and second extended lead portions is a lateral lead portion that is adjacent to an outer surface of one of the current collector layers.

20. The electrode stack assembly of claim 12, wherein at least a portion of the first and second side lead portions are overlying a portion of a tab element.

21. The electrode stack assembly of claim 12, wherein the first tab element comprises a lateral lead portion extending into the electrode stack assembly between the first and second electrode assemblies.

22. The electrode stack assembly of claim 21, wherein the second tab element comprises a second lateral lead portion extending into the electrode stack assembly between the first and second electrode assemblies and on a similar surface as the first lateral lead portion.

23. The electrode stack assembly of claim 21, wherein the second tab element comprises a second lateral lead portion extending into the electrode stack assembly between the first and second electrode assemblies and on an opposite surface of a similar layer as the first lateral lead portion.

24. An electrode assembly for a stacked-cell battery, wherein the electrode assembly comprises:

an active material layer;

a current collector layer adjacent to and in electrical contact with an outer surface of the active material layer;

a tab element having an end lead portion and an extended lead portion, the end lead portion being in electrical contact with at least one of the active material layer and the current collector layer, and the extended lead portion being a lateral lead portion extending away from the end lead portion and between the outer surface of the active material layer and the current collector layer and is adapted to provide an electrical connection to the electrode assembly; and an insulative layer covering an inner contact area of the extended lead portion to electrically insulate this portion of the tab element.

25. An electrode assembly for a stacked-cell battery, wherein the electrode assembly comprises:

an active material layer;

a current collector layer adjacent to and in electrical contact with an outer surface of the active material layer;

a tab element having an end lead portion and an extended lead portion, the end lead portion being in electrical contact with at least one of the active material layer and the current collector layer, and the extended lead portion being a lateral lead portion extending away from the end lead portion and being substantially adjacent to an outer surface of the current collector layer and is adapted to provide an electrical connection to the electrode assembly; and an insulative layer covering an inner contact area of the extended lead portion to electrically insulate this portion of the tab element.

* * * * *